(12) United States Patent
Seo et al.

(10) Patent No.: US 12,245,321 B2
(45) Date of Patent: Mar. 4, 2025

(54) DRX OPERATION IN WIRELESS COMMUNICATION SYSTEM, OPERATION METHOD IN DORMANT BWP AND TERMINAL USING METHOD

(71) Applicant: LG ELECTRONICS INC., Seoul (KR)

(72) Inventors: Inkwon Seo, Seoul (KR); Joonkui Ahn, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 427 days.

(21) Appl. No.: 17/754,295

(22) PCT Filed: Sep. 2, 2020

(86) PCT No.: PCT/KR2020/011770
§ 371 (c)(1),
(2) Date: Mar. 29, 2022

(87) PCT Pub. No.: WO2021/066331
PCT Pub. Date: Apr. 8, 2021

(65) Prior Publication Data
US 2022/0330378 A1 Oct. 13, 2022

Related U.S. Application Data

(60) Provisional application No. 62/910,378, filed on Oct. 3, 2019.

(51) Int. Cl.
*H04W 76/28* (2018.01)
*H04L 5/00* (2006.01)
(Continued)

(52) U.S. Cl.
CPC .......... *H04W 76/28* (2018.02); *H04L 5/0098* (2013.01); *H04W 24/08* (2013.01); *H04W 72/044* (2013.01); *H04W 72/23* (2023.01)

(58) Field of Classification Search
CPC ... H04W 76/28; H04W 24/08; H04W 72/044; H04W 72/23; H04W 52/0216;
(Continued)

(56) References Cited

U.S. PATENT DOCUMENTS 11,558,167 B2 * 1/2023 Kim ...................... H04W 72/23
2019/0103954 A1 4/2019 Lee et al.
(Continued)

OTHER PUBLICATIONS

PCT International Application No. PCT/KR2020/011770, International Search Report dated Nov. 25, 2020, 4 pages.
(Continued)

*Primary Examiner* — Afshawn M Towfighi
(74) *Attorney, Agent, or Firm* — LEE, HONG, DEGERMAN, KANG & WAIMEY

(57) ABSTRACT

The present specification discloses a DRX operation method performed, by a terminal in which a PCell and a SCell are configured, in a wireless communication system. The DRX operation method comprises: receiving DRX configuration information from a base station; monitoring a PDCCH on the PCell based on the DRX configuration information; receiving dormant BWP configuration information from the base station, wherein the dormant BWP configuration information is information about a downlink BWP used as a dormant BWP on the SCell, from among at least one downlink BWP configured for the terminal; receiving, from the base station, DCI for notifying activation of the dormant BWP; and stopping monitoring a second PDCCH in the
(Continued)

dormant BWP on the SCell, wherein a BWP inactivity timer is not used based on the activation of the dormant BWP, and the BWP inactivity timer may be a timer for transition to a default BWP.

10 Claims, 27 Drawing Sheets

(51) Int. Cl.
*H04W 24/08* (2009.01)
*H04W 72/044* (2023.01)
*H04W 72/23* (2023.01)

(58) Field of Classification Search
CPC .............. H04W 48/16; H04W 72/0457; H04L 5/0098; H04L 1/1861; H04L 1/1893; H04L 1/0026; H04L 5/0023; H04L 5/001; H04L 5/0053; H04L 5/0087; H04L 5/006; Y02D 30/70; H04B 7/0626
See application file for complete search history.

(56) References Cited

U.S. PATENT DOCUMENTS

| | | |
|---|---|---|
| 2019/0215868 A1 | 7/2019 | Ye |
| 2019/0297577 A1 | 9/2019 | Lin et al. |
| 2020/0037248 A1* | 1/2020 | Zhou ..................... H04L 5/0032 |
| 2021/0051640 A1* | 2/2021 | Pao ..................... H04W 72/044 |
| 2021/0176030 A1* | 6/2021 | Tsai ..................... H04W 76/27 |
| 2021/0203468 A1* | 7/2021 | Yi ..................... H04W 72/0453 |
| 2021/0250920 A1* | 8/2021 | Kim ................. H04W 72/0453 |
| 2022/0046522 A1* | 2/2022 | Kim ..................... H04W 52/365 |

OTHER PUBLICATIONS

Qualcomm Incorporated, "UE Adaptation to the Traffic and UE Power Consumption Characteristics," R1-1900911, 3GPP TSG-RAN WG1 Ad-Hoc Meeting 1901, Jan. 2019, 26 pages.

ZTE Corporation et al., "On delay reduction of SCell Activation," R2-1910750, 3GPP TSG-RAN WG2 Meeting #107, Aug. 2019, 8 pages.

\* cited by examiner

DRX OPERATION IN WIRELESS COMMUNICATION SYSTEM, OPERATION METHOD IN DORMANT BWP AND TERMINAL USING METHOD

CROSS-REFERENCE TO RELATED APPLICATIONS

This application is the National Stage filing under 35 U.S.C. 371 of International Application No. PCT/KR2020/011770, filed on Sep. 2, 2020, which claims the benefit of U.S. Provisional Application No. 62/910,378 filed on Oct. 3, 2019, the contents of which are all hereby incorporated by reference herein in their entireties.

BACKGROUNDS

Field of the Disclosure

The present disclosure relates to wireless communication.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or user equipments (UEs) sensitive to reliability and latency are under discussion. Introduction of next-generation RAT considering enhanced mobile broadband communication, massive MTC, and ultra-reliable and low-latency communication (URLLC) is under discussion. In the disclosure, for convenience of description, this technology may be referred to as new RAT or new radio (NR).

In the NR system, each serving cell may be configured with a plurality of (e.g., maximum 4) bandwidth parts (BWP). Accordingly, a dormancy operation for each cell and/or BWP needs to be defined.

SUMMARY

According to an embodiment of the present disclosure, provided is a method for performing a discontinuous reception (DRX) operation performed by a user equipment (UE) to which a primary cell (PCell) and a secondary cell (SCell) are configured in a wireless communication system, the method comprising: receiving, from a base station, DRX configuration information; performing a first physical downlink control channel (PDCCH) monitoring on the PCell based on the DRX configuration information; receiving, from the base station, dormant bandwidth part (BWP) configuration information, wherein the dormant BWP configuration information is information about a downlink BWP used as a dormant BWP among at least one downlink BWP on the SCell configured for the UE; receiving, from the base station, downlink control information (DCI) informing an activation of the dormant BWP; and stopping a second PDCCH monitoring in the dormant BWP on the SCell, wherein a BWP inactivity timer is not used based on the activation of the dormant BWP, and the BWP inactivity timer is a timer for a transition to a default BWP.

According to the present disclosure, when the terminal is in the dormant BWP, the existing BWP inactivity timer is not used. Accordingly, when the terminal is in the dormant BWP for power saving, the problem that the terminal is forcibly transferred to the default (unintentionally) can be solved.

Effects obtained through specific examples of this specification are not limited to the foregoing effects. For example, there may be a variety of technical effects that a person having ordinary skill in the related art can understand or derive from this specification. Accordingly, specific effects of the disclosure are not limited to those explicitly indicated herein but may include various effects that may be understood or derived from technical features of the disclosure.

DESCRIPTION OF EXEMPLARY EMBODIMENTS

As used herein, "A or B" may mean "only A", "only B", or "both A and B". That is, "A or B" may be interpreted as "A and/or B" herein. For example, "A, B or C" may mean "only A", "only B", "only C", or "any combination of A, B, and C".

As used herein, a slash (/) or a comma (,) may mean "and/or". For example, "A/B" may mean "A and/or B". Therefore, "A/B" may include "only A", "only B", or "both A and B". For example, "A, B, C" may mean "A, B, or C".

As used herein, "at least one of A and B" may mean "only A", "only B", or "both A and B". Further, as used herein, "at least one of A or B" or "at least one of A and/or B" may be interpreted equally as "at least one of A and B".

As used herein, "at least one of A, B, and C" may mean "only A", "only B", "only C", or "any combination of A, B, and C". Further, "at least one of A, B, or C" or "at least one of A, B, and/or C" may mean "at least one of A, B, and C".

As used herein, parentheses may mean "for example". For instance, the expression "control information (PDCCH)" may mean that a PDCCH is proposed as an example of control information. That is, control information is not limited to a PDCCH, but a PDCCH is proposed as an example of control information. Further, the expression "control information (i.e., a PDCCH)" may also mean that a PDCCH is proposed as an example of control information.

Technical features that are separately described in one drawing may be implemented separately or may be implemented simultaneously.

Figure 1:
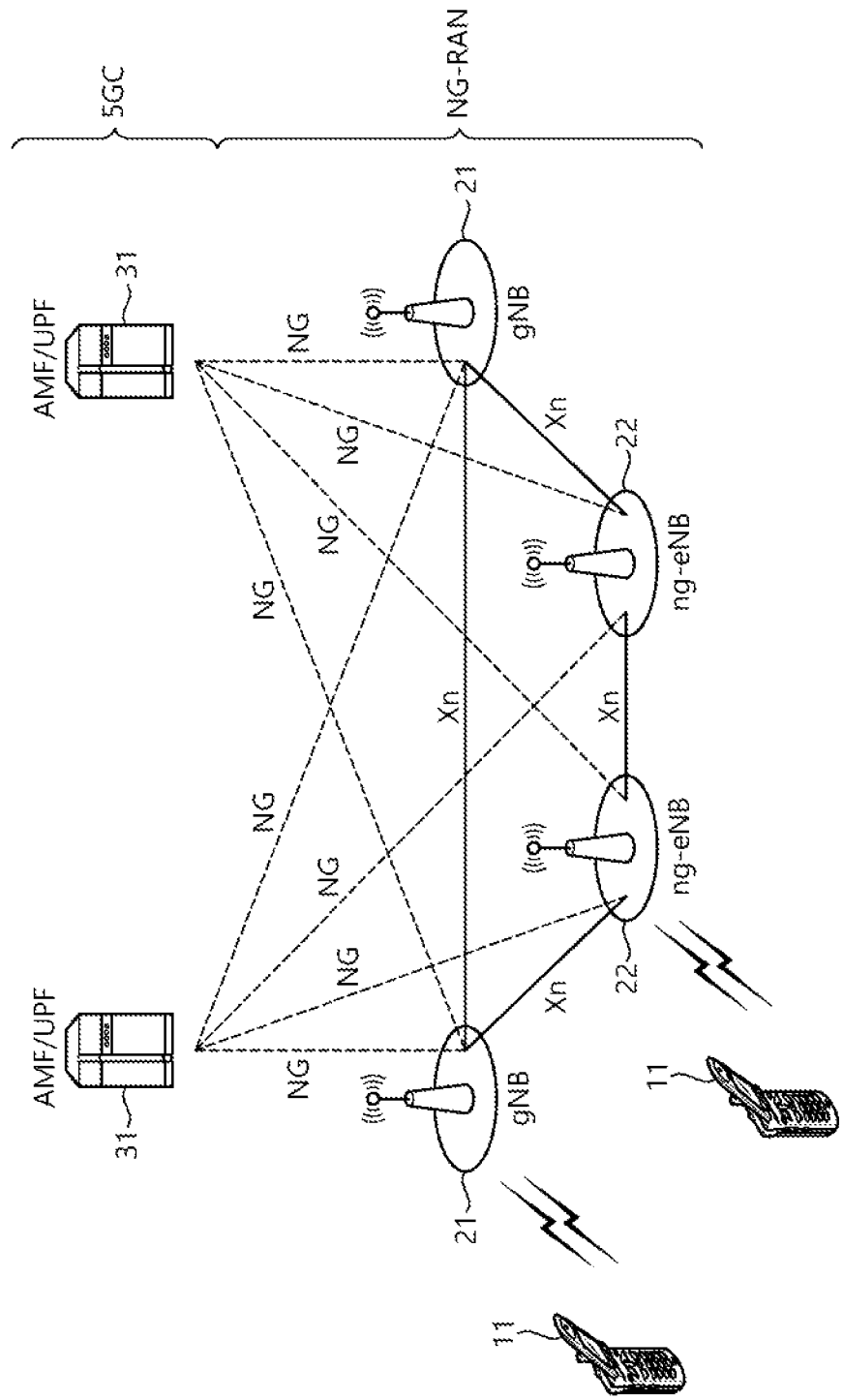
FIG. 1 shows another example of a wireless communication system to which a technical feature of the present disclosure can be applied.

FIG. 1 shows another example of a wireless communication system to which a technical feature of the present disclosure can be applied.

Specifically, FIG. 1 shows a system architecture based on a 5G new radio access technology (NR) system. An entity used in the 5G NR system (hereinafter, simply referred to as "NR") may absorb some or all functions of the entity (e.g., eNB, MME, S-GW) introduced in FIG. 1 (e.g., eNB, MME, S-GW). The entity used in the NR system may be identified in the name of "NG" to distinguish it from LTE.

Referring to FIG. 1, a wireless communication system includes one or more UEs 11, a next-generation RAN (NG-RAN), and a 5$^{th}$ generation core network (5GC). The NG-RAN consists of at least one NG-RAN node. The NG-RAN node is an entity corresponding to the BS 20 of FIG. 1. The NG-RAN node consists of at least one gNB 21 and/or at least one ng-eNB 22. The gNB 21 provides NR user plane and control plane protocol terminations towards the UE 11. The Ng-eNB 22 provides an E-UTRA user plane and control plane protocol terminations towards the UE 11.

The 5GC includes an access and mobility management function (AMF), a user plane function (UPF), and a session management function (SMF). The AMF hosts functions, such as non-access stratum (NAS) security, idle state mobility processing, and so on. The AMF is an entity including the conventional MMF function. The UPF hosts functions, such as mobility anchoring, protocol data unit (PDU) processing, and so on. The UPF is an entity including the conventional S-GW function. The SMF hosts functions, such as UE Internet Protocol (IP) address allocation, PDU session control, and so on.

The gNB and the ng-eNB are interconnected through an Xn interface. The gNB and the ng-eNB are also connected to the 5GC through an NG interface. More specifically, the gNB and the ng-eNB are connected to the AMF through an NG-C interface, and are connected to the UPF through an NG-U interface.

The structure of a radio frame in NR is described. In LTE/LTE-A, one radio frame consists of 10 subframes, and one subframe consists of two slots. The length of one subframe may be 1 ms, and the length of one slot may be 0.5 ms. A time (generally over one subframe) for transmitting one transport block from a higher layer to a physical layer is defined as a transmission time interval (TTI). The TTI may be a minimum unit of scheduling.

Unlike LTE/LTE-A, NR supports various numerologies, so the radio frame structure may vary. NR supports multiple subcarrier spacing in the frequency domain. Table 1 shows several numerologies supported in NR. Each numerology can be identified by an index $\mu$.

TABLE 1

| $\mu$ | Subcarrier spacing(kHz) | CP | Support for data? | Support for synchronization |
|---|---|---|---|---|
| 0 | 15 | normal CP | Yes | Yes |
| 1 | 30 | normal CP | Yes | Yes |
| 2 | 60 | normal/extended CP | Yes | No |
| 3 | 120 | normal CP | Yes | Yes |
| 4 | 240 | normal CP | No | Yes |

Referring to Table 1, the subcarrier spacing may be set to one of 15, 30, 60, 120, and 240 kHz identified by the index $\mu$. However, the subcarrier spacing shown in Table 1 is merely exemplary, and the specific subcarrier spacing may be changed. Accordingly, each subcarrier interval (e.g., $\mu$=0, 1, ... 4) may be expressed as a first subcarrier interval, a second subcarrier interval ... Nth subcarrier interval. Referring to Table 1, transmission of user data (e.g., a physical uplink shared channel (PUSCH) and a physical downlink shared channel (PDSCH)) may not be supported according to the subcarrier interval. That is, the transmission of user data may not be supported only in at least one specific subcarrier interval (e.g., 240 kHz).

In addition, referring to Table 1, a synchronization channel (PSS (primary synchronization signal), SSS (secondary synchronization signal), and PBCH (physical broadcasting channel) may not be supported depending on the subcarrier interval. That is, the synchronization channel may not be supported only in at least one specific subcarrier interval (e.g., 60 kHz).

In NR, the number of slots and the number of symbols included in one radio frame/subframe may vary according to various numerologies, that is, various subcarrier intervals. Table 2 shows examples of the number of OFDM symbols per slot, the number of slots per radio frame, and the number of slots per subframe in a general cyclic prefix (CP).

TABLE 2

| μ | Number of OFDM symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2:
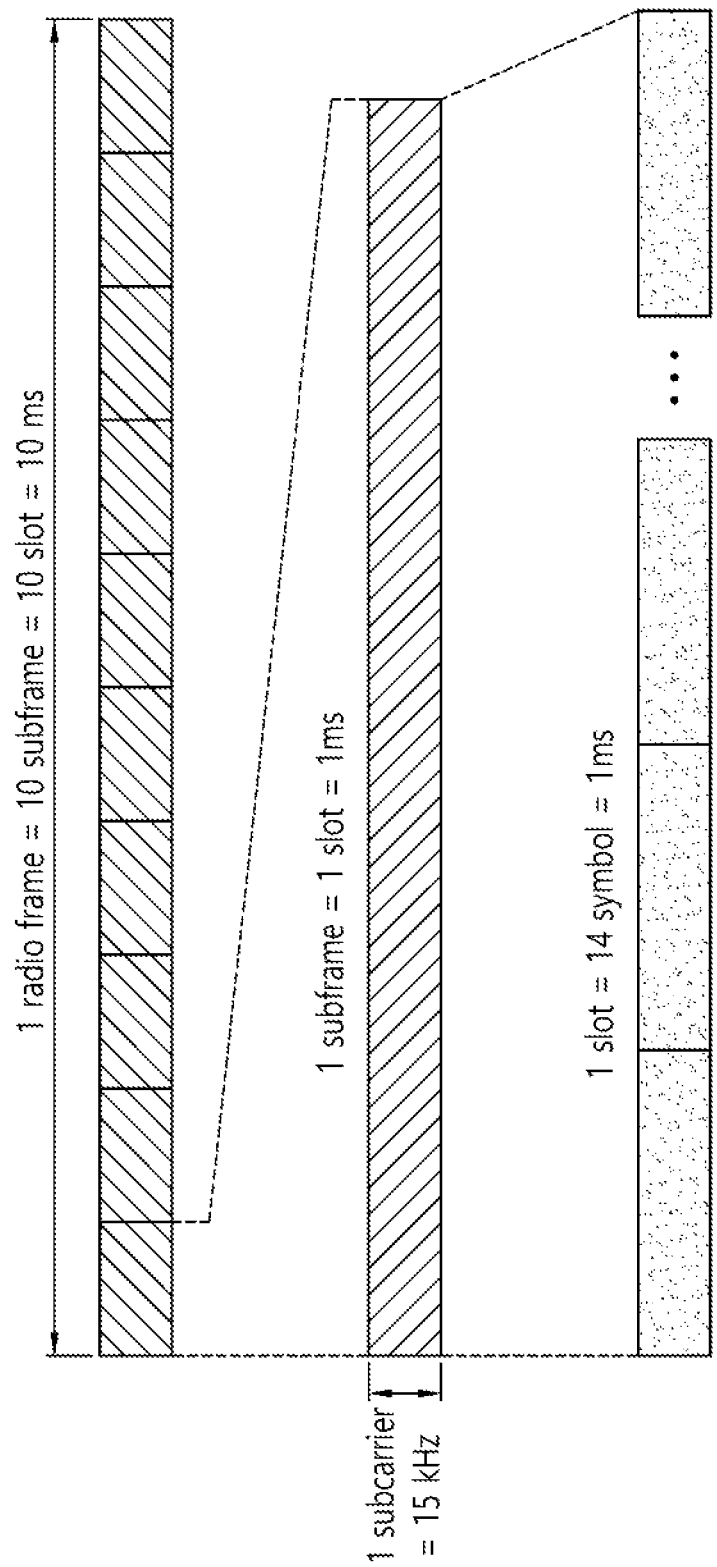
FIG. 2 shows an example of a frame structure to which the technical features of the present disclosure can be applied.

Referring to Table 2, when the first numerology corresponding to μ=0 is applied, one radio frame includes 10 subframes, one subframe corresponds to one slot, and one slot consists of 14 symbols. In this specification, a symbol represents a signal transmitted during a specific time interval. For example, a symbol may represent a signal generated by OFDM processing. That is, in this specification, a symbol may refer to an OFDM/OFDMA symbol or an SC-FDMA symbol. CP may be located between each symbol. FIG. 2 shows an example of a frame structure to which the technical features of the present disclosure can be applied. In FIG. 2, the subcarrier spacing is 15 kHz, which corresponds to μ=0.

Figure 3:
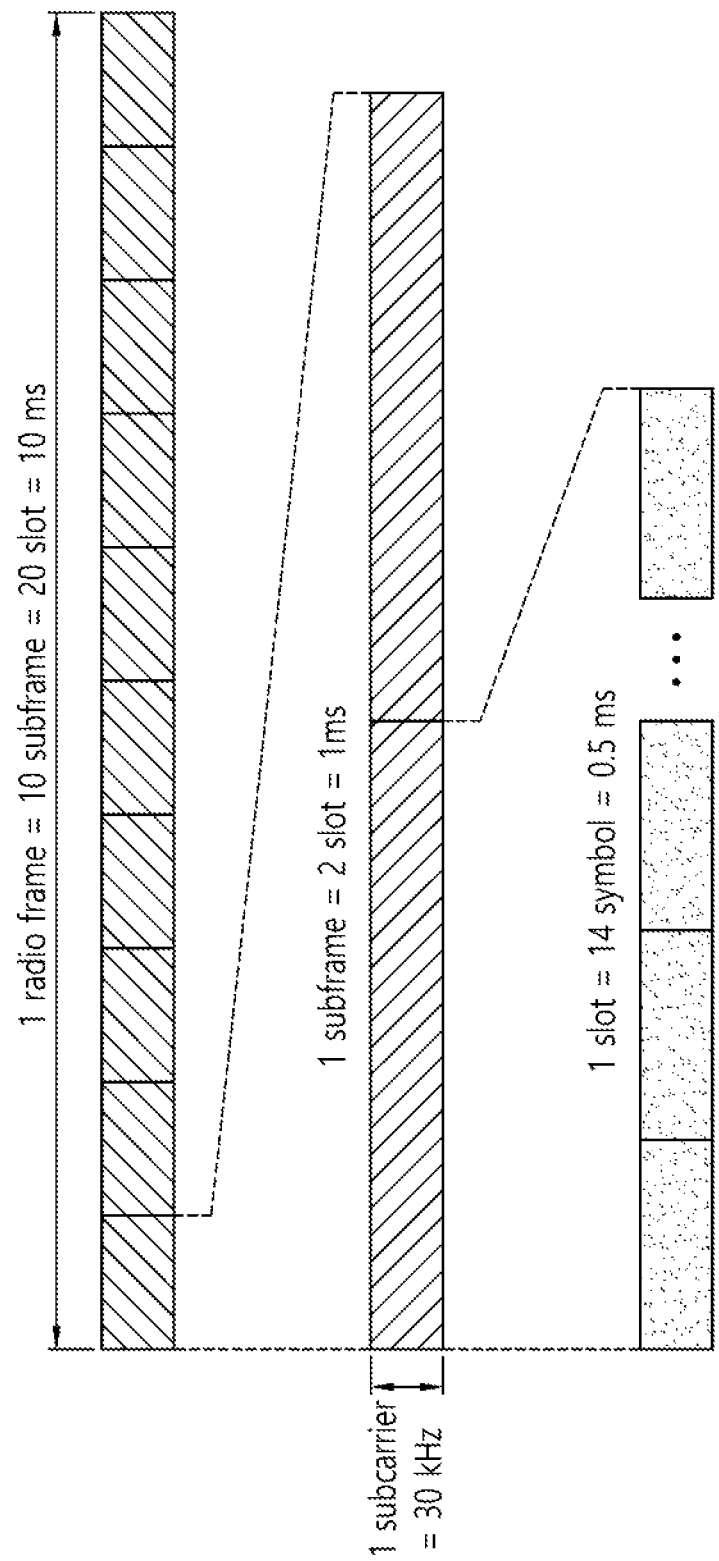
FIG. 3 shows another example of a frame structure to which the technical features of the present disclosure can be applied.

FIG. 3 shows another example of a frame structure to which the technical features of the present disclosure can be applied. In FIG. 3, the subcarrier spacing is 30 kHz, which corresponds to μ=1.

Meanwhile, frequency division duplex (FDD) and/or time division duplex (TDD) may be applied to a wireless communication system to which an embodiment of the present disclosure is applied. When TDD is applied, in LTE/LTE-A, UL subframes and DL subframes are allocated in units of subframes.

In NR, the symbols in a slot can be classified into DL symbols (denoted by D), floating symbols (denoted by X) and UL symbols (denoted by U). In a slot of a DL frame, the UE assumes that DL transmission occurs only in DL symbols or floating symbols. In a slot of a UL frame, the UE must transmit only in UL symbols or floating symbols.

Table 3 shows examples of slot formats identified by corresponding format indexes. The contents of Table 3 may be commonly applied to a specific cell, or may be applied to each UE individually or differently.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 3 shows only a part of the slot format actually defined in NR. A specific allocation method may be changed or added. The UE may receive the slot format configuration through higher layer signaling (i.e., radio resource control (RRC) signaling). Alternatively, the UE may receive the slot format configuration through downlink control information (DCI) received through the PDCCH. Alternatively, the UE may receive the slot format configuration through a combination of higher layer signaling and DCI.

Figure 4:
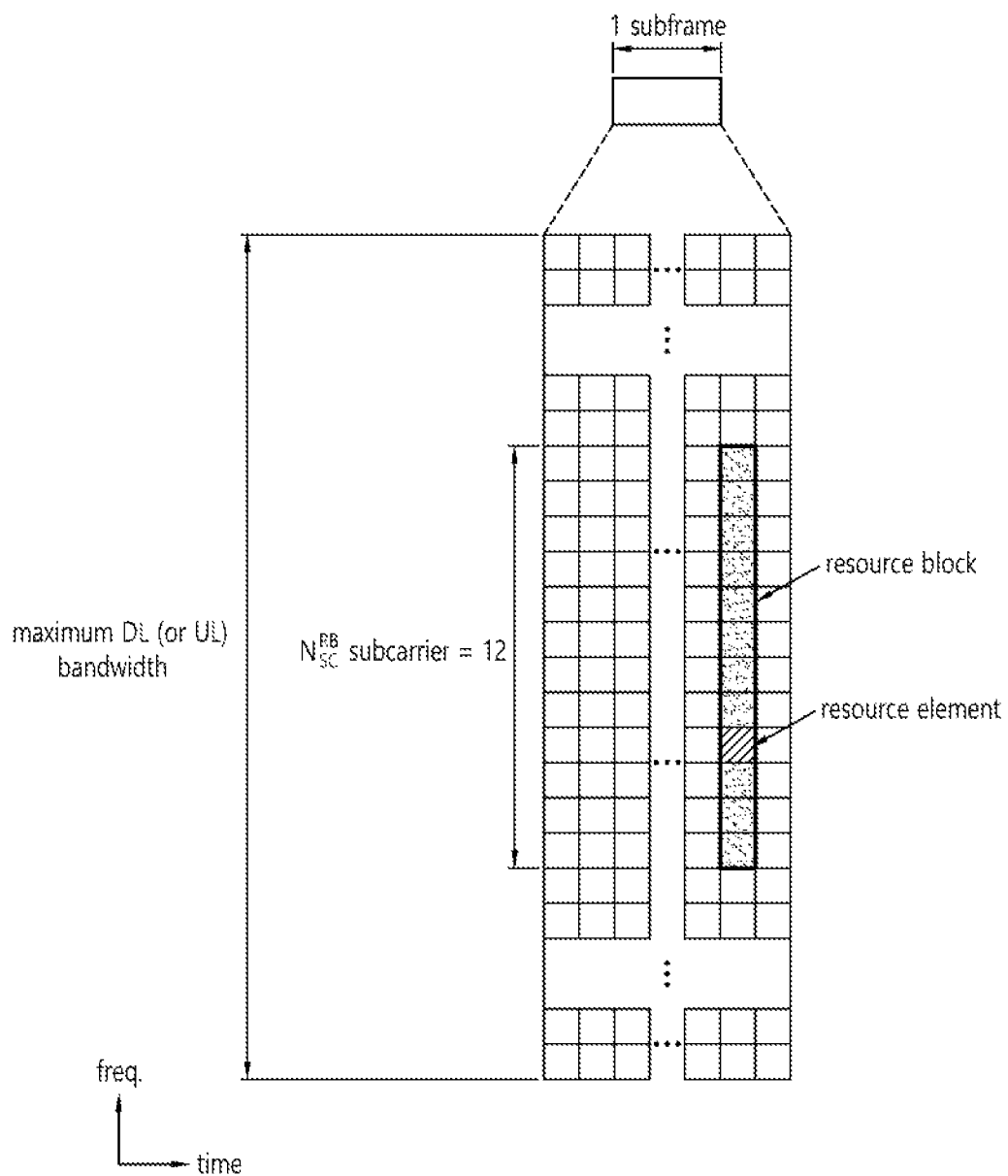
FIG. 4 shows an example of a resource grid to which the technical features of the present disclosure can be applied.

FIG. 4 shows an example of a resource grid to which the technical features of the present disclosure can be applied.

The example shown in FIG. 4 is a time-frequency resource grid used in NR. The example shown in FIG. 4 may be applied to UL and/or DL. Referring to FIG. 4, a plurality of slots are included in one subframe in the time domain. Specifically, when expressed according to the value of "μ", a "14*2μ" symbol may be represented in the resource grid. In addition, one resource block (RB) may occupy 12 consecutive subcarriers. One RB may be referred to as a physical resource block (PRB), and 12 resource elements (REs) may be included in each PRB. The number of allocable RBs may be determined based on a minimum value and a maximum value. The number of allocable RBs can be individually configured according to the numerology ("μ"). The number of allocable RBs may be configured with the same value for UL and DL, or may be configured with different values for UL and DL.

A cell search scheme in NR is described. The UE may perform cell search to obtain time and/or frequency synchronization with the cell and to obtain a cell identifier (ID). Synchronization channels such as PSS, SSS and PBCH may be used for cell search.

<Self-Contained Subframe Structure>

In $5^{th}$ generation NR, a structure in which a control channel and a data channel are time-division-multiplexed, as shown in figure below, can be considered as a frame structure in order to minimize latency.

Figure 5:
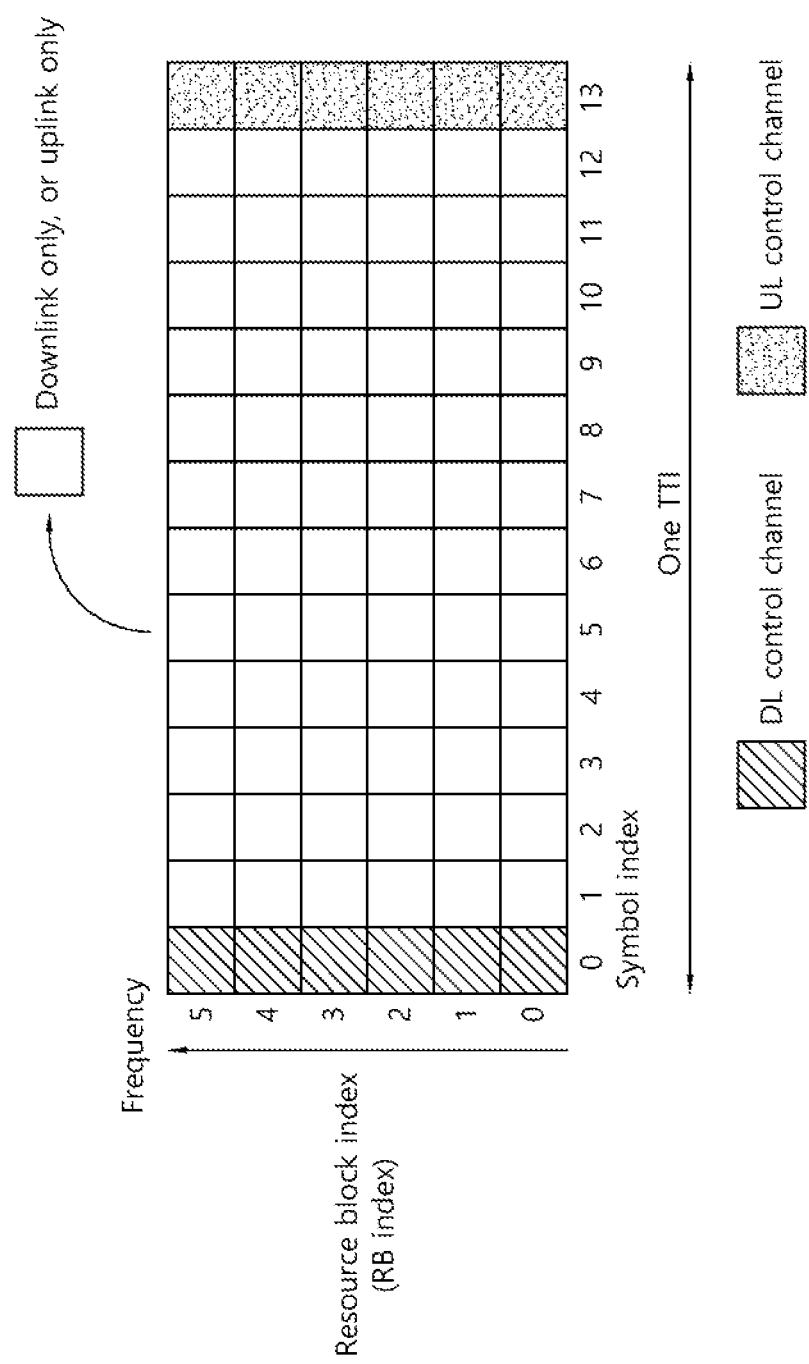
FIG. 5 schematically illustrates an example of a frame structure based on a structure in which a data channel and a control channel are TDMed.

FIG. 5 schematically illustrates an example of a frame structure based on a structure in which a data channel and a control channel are TDMed.

Referring to FIG. 5, as an example of a frame structure, one subframe (where the subframe may be referred to as a Transmission Time Interval (TTI)) may be expressed based on an index of a symbol. In this case, one TTI may include a region related to a downlink control channel, a region related to an uplink control channel, and a downlink or uplink region.

For example, when the TTI structure is described based on FIG. 5, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming-2>

In the NR system, when multiple antennas are used, a hybrid beamforming technique combining digital beamforming and analog beamforming is emerging. In this case, analog beamforming (or RF beamforming) refers to an operation of performing precoding (or combining) in the RF unit.

In the hybrid beamforming, a baseband end and an RF end perform precoding (or combining), respectively, and this has the advantage of being able to achieve performance close to digital beamforming while reducing the number of RF chains and the number of D/A (or A/D) converters.

For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

For convenience of understanding, a schematic diagram of a hybrid beamforming structure in terms of a TXRU and a physical antenna is as follows.

Figure 6:
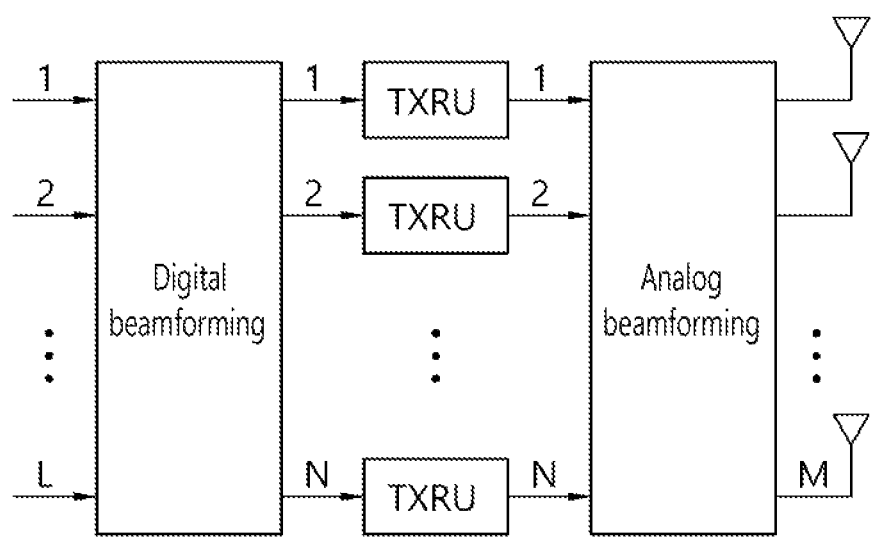
FIG. 6 is an abstract schematic diagram illustrating hybrid beamforming from the viewpoint of TXRUs and physical antennas.

FIG. 6 is an abstract schematic diagram illustrating hybrid beamforming from the viewpoint of TXRUs and physical antennas.

In FIG. 6, the number of digital beams is L and the number of analog beams is N. Further, in the NR system, by designing the base station to change the analog beamforming in units of symbols, it is considered to support more efficient beamforming for a terminal located in a specific area.

Furthermore, when defining N TXRUs and M RF antennas as one antenna panel in FIG. 6, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Hereinafter, a beam sweeping operation with respect to a synchronization signal and system information in a downlink transmission process will be described in more detail with reference to drawings.

Figure 7:
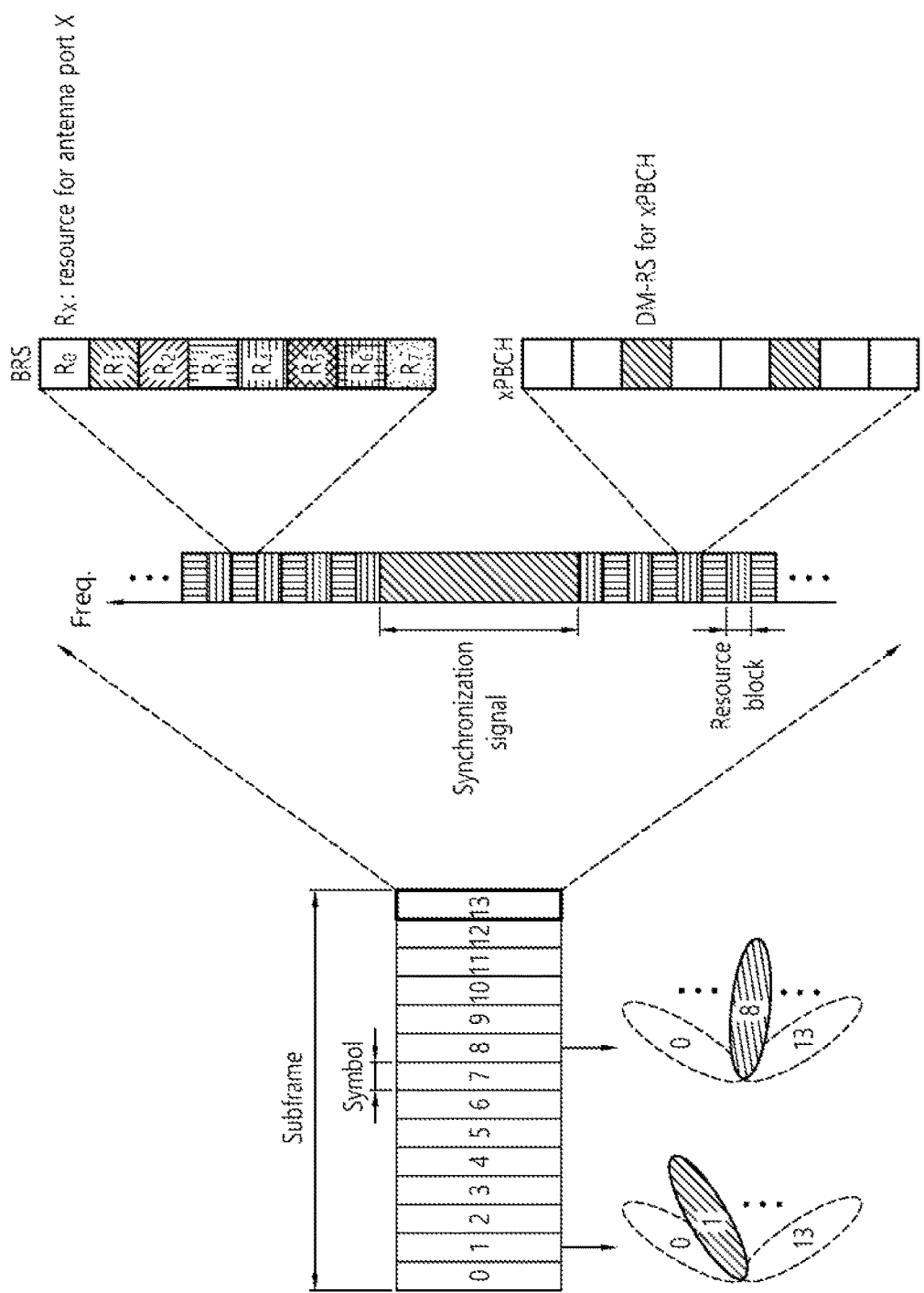
FIG. 7 illustrates the beam sweeping operation for a synchronization signal and system information in a downlink (DL) transmission procedure.

FIG. 7 illustrates the beam sweeping operation for a synchronization signal and system information in a downlink (DL) transmission procedure.

In FIG. 7, physical resources (or a physical channel) in which system information of the NR system is transmitted in a broadcasting manner is referred to as a physical broadcast channel (xPBCH).

Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam is under discussion.

The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Figure 8:
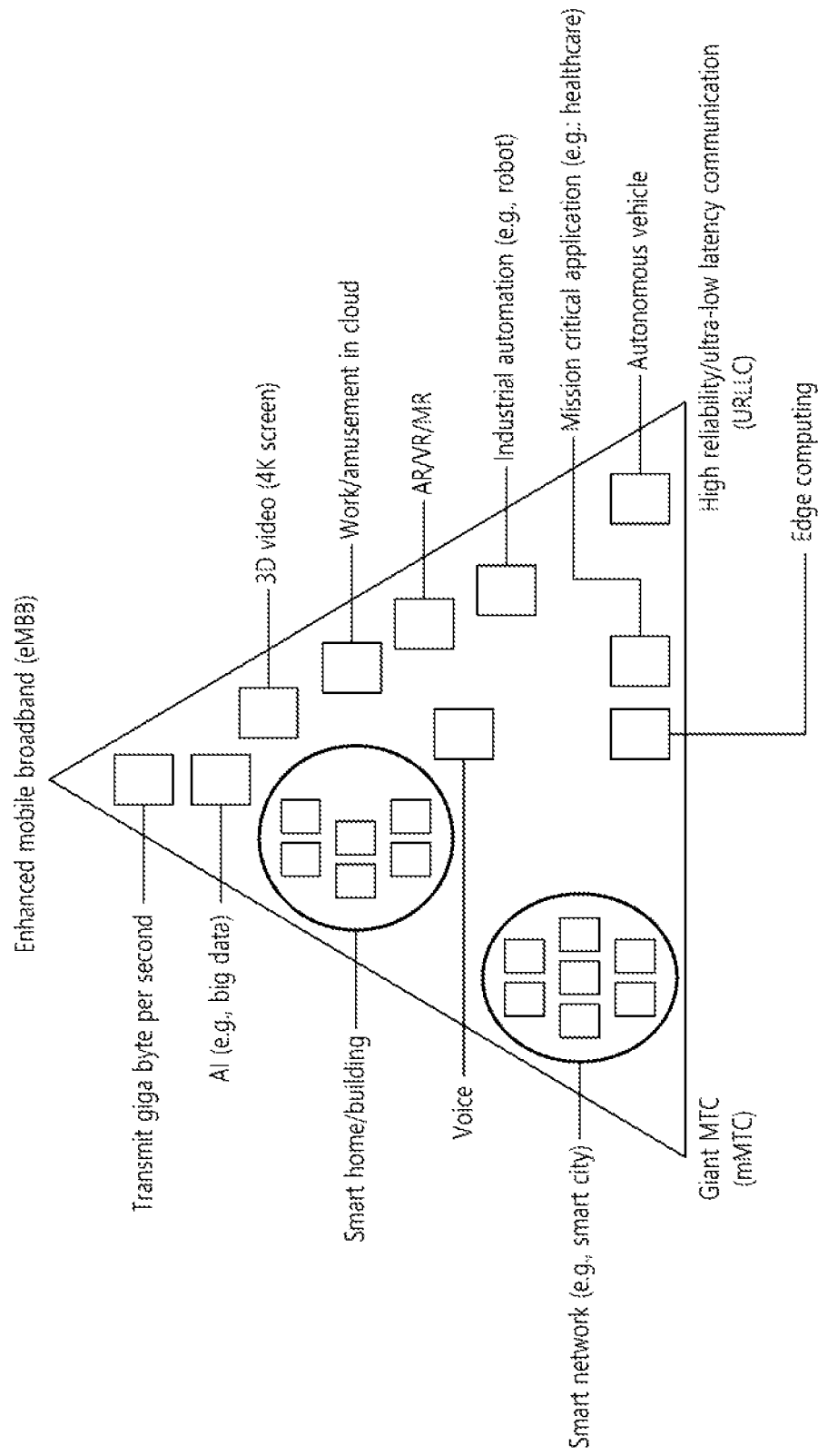
FIG. 8 shows examples of 5G usage scenarios to which the technical features of the present disclosure can be applied.

FIG. 8 shows examples of 5G usage scenarios to which the technical features of the present disclosure can be applied. The 5G usage scenarios shown in FIG. 8 are only exemplary, and the technical features of the present disclosure can be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and batterydriven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 8 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 9:
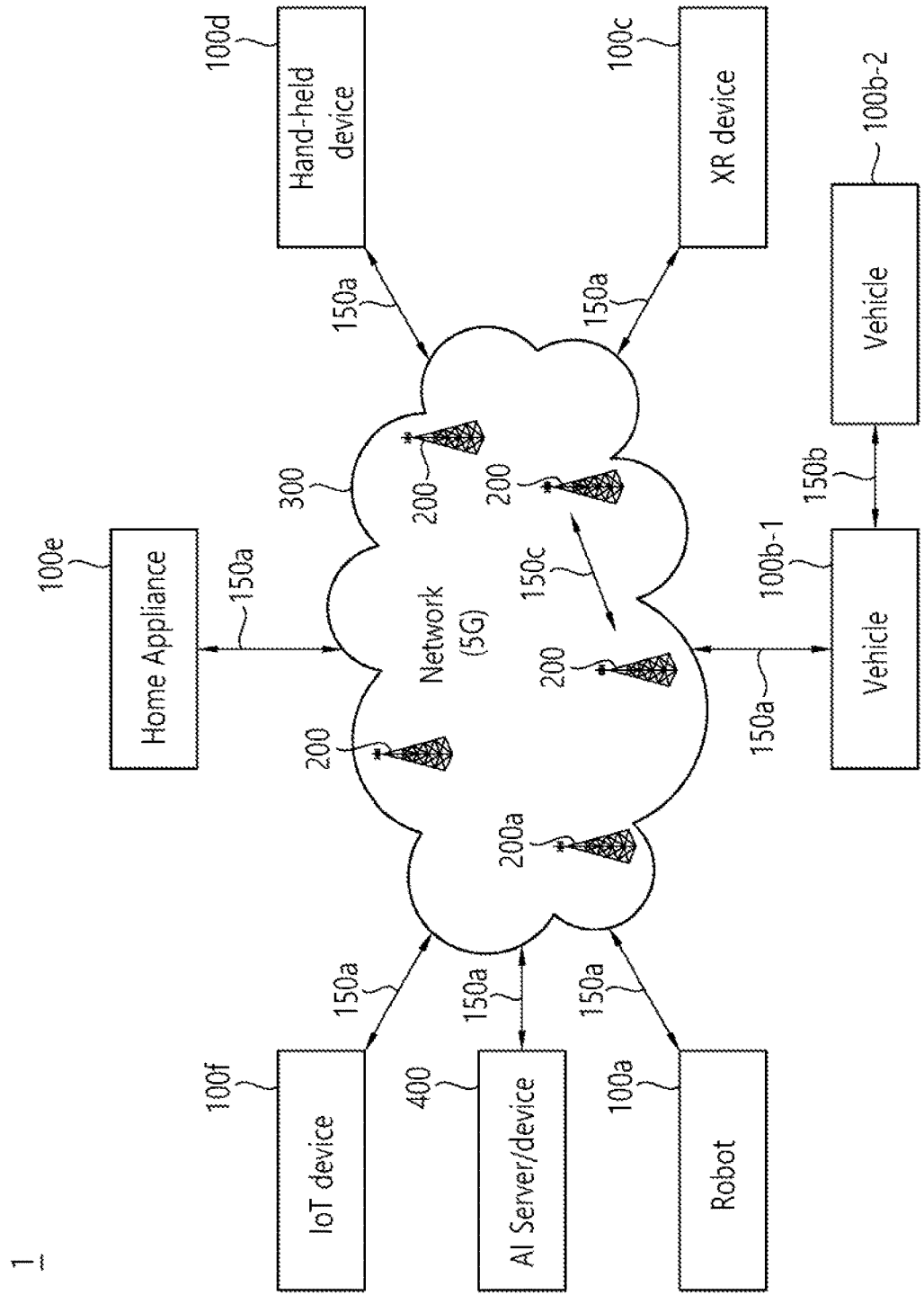
FIG. 9 illustrates a communication system 1 applied to the disclosure.

FIG. 9 illustrates a communication system 1 applied to the disclosure.

Referring to FIG. 9, the communication system 1 applied to the disclosure includes a wireless device, a base station, and a network. Here, the wireless device refers to a device that performs communication using a radio access technology (e.g., 5G new RAT (NR) or Long-Term Evolution (LTE)) and may be referred to as a communication/wireless/ 5G device. The wireless device may include, but limited to, a robot 100a, a vehicle 100b-1 and 100b-2, an extended reality (XR) device 100c, a hand-held device 100d, a home appliance 100e, an Internet of things (IoT) device 100f, and an AI device/server 400. For example, the vehicle may include a vehicle having a wireless communication function, an autonomous driving vehicle, a vehicle capable of inter-vehicle communication, or the like. Here, the vehicle may include an unmanned aerial vehicle (UAV) (e.g., a drone). The XR device may include augmented reality (AR)/virtual reality (VR)/mixed reality (MR) devices and may be configured as a head-mounted device (HMD), a vehicular head-up display (HUD), a television, a smartphone, a computer, a wearable device, a home appliance, digital signage, a vehicle, a robot, or the like. The hand-held device may include a smartphone, a smartpad, a wearable device (e.g., a smart watch or smart glasses), and a computer (e.g., a notebook). The home appliance may include a TV, a refrigerator, a washing machine, and the like. The IoT device may include a sensor, a smart meter, and the like. The base station and the network may be configured, for example, as wireless devices, and a specific wireless device 200a may operate as a base station/network node for other wireless devices.

Here, the wireless communication technology implemented in the wireless device of the present disclosure may include a narrowband Internet of Things for low-power communication as well as LTE, NR, and 6G. At this time, for example, NB-IoT technology may be an example of low power wide area network (LPWAN) technology, and may be implemented in standards such as LTE Cat NB1 and/or LTE Cat NB2, may be implemented in the standard of LTE Cat NB1 and/or LTE Cat NB2, and is not limited to the names mentioned above. Additionally or alternatively, the wireless communication technology implemented in the wireless device of the present disclosure may perform communication based on LTE-M technology. In this case, as an example, the LTE-M technology may be an example of an LPWAN technology, and may be called by various names such as enhanced machine type communication (eMTC). For example, LTE-M technology may be implemented by at least any one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the names described above. Additionally or alternatively, the wireless communication technology implemented in the wireless device of the present disclosure may include at least one of ZigBee, Bluetooth, and LPWAN considering low power communication and is not limited to the names described above. For example, the ZigBee technology may create personal area networks (PAN) related to small/low-power digital communication based on various standards such as IEEE 802.15.4, and may be called by various names.

The wireless devices 100a to 100f may be connected to the network 300 through the base station 200. Artificial intelligence (AI) technology may be applied to the wireless devices 100a to 100f, and the wireless devices 100a to 100f may be connected to an AI server 400 through the network 300. The network 300 may be configured using a 3G network, a 4G (e.g., LTE) network, or a 5G (e.g., NR) network. The wireless devices 100a to 100f may communicate with each other via the base station 200/network 300 and may also perform direct communication (e.g. sidelink communication) with each other without passing through the base station/network. For example, the vehicles 100b-1 and 100b-2 may perform direct communication (e.g. vehicle-to-vehicle (V2V)/vehicle-to-everything (V2X) communication). Further, the IoT device (e.g., a sensor) may directly communicate with another IoT device (e.g., a sensor) or another wireless device 100a to 100f.

Wireless communications/connections 150a, 150b, and 150c may be established between the wireless devices 100a to 100f and the base station 200 and between the base stations 200. Here, the wireless communications/connections may be established by various wireless access technologies (e.g., 5G NR), such as uplink/downlink communication 150a, sidelink communication 150b (or D2D communication), and inter-base station communication 150c (e.g., relay or integrated access backhaul (IAB)). The wireless devices and the base station/wireless devices, and the base stations may transmit/receive radio signals to/from each other through the wireless communications/connections 150a, 150b, and 150c. For example, the wireless communications/connections 150a, 150b, and 150c may transmit/receive signals over various physical channels. To this end, at least some of various configuration information setting processes, various signal processing processes (e.g., channel encoding/decoding, modulation/demodulation, resource mapping/demapping, and the like), and resource allocation processes may be performed on the basis of various proposals of the disclosure.

Meanwhile, NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 4. For convenience of description, FR1 of the frequency ranges used for an NR system may refer to a "sub 6 GHz range", and FR2 may refer to an "above 6 GHz range" and may be referred to as a millimeter wave (mmW).

TABLE 4

| Frequency range designation | Corresponding frequency range | Subcarrier spacing |
| --- | --- | --- |
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 5. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 5

| Frequency range designation | Corresponding frequency range | Subcarrier spacing |
| --- | --- | --- |
| FR1 | 410 MHz-7125 MHz | 15, 30, 60 kHz |
| FR2 | 24250 MHz-52600 MHz | 60, 120, 240 kHz |

Figure 10:
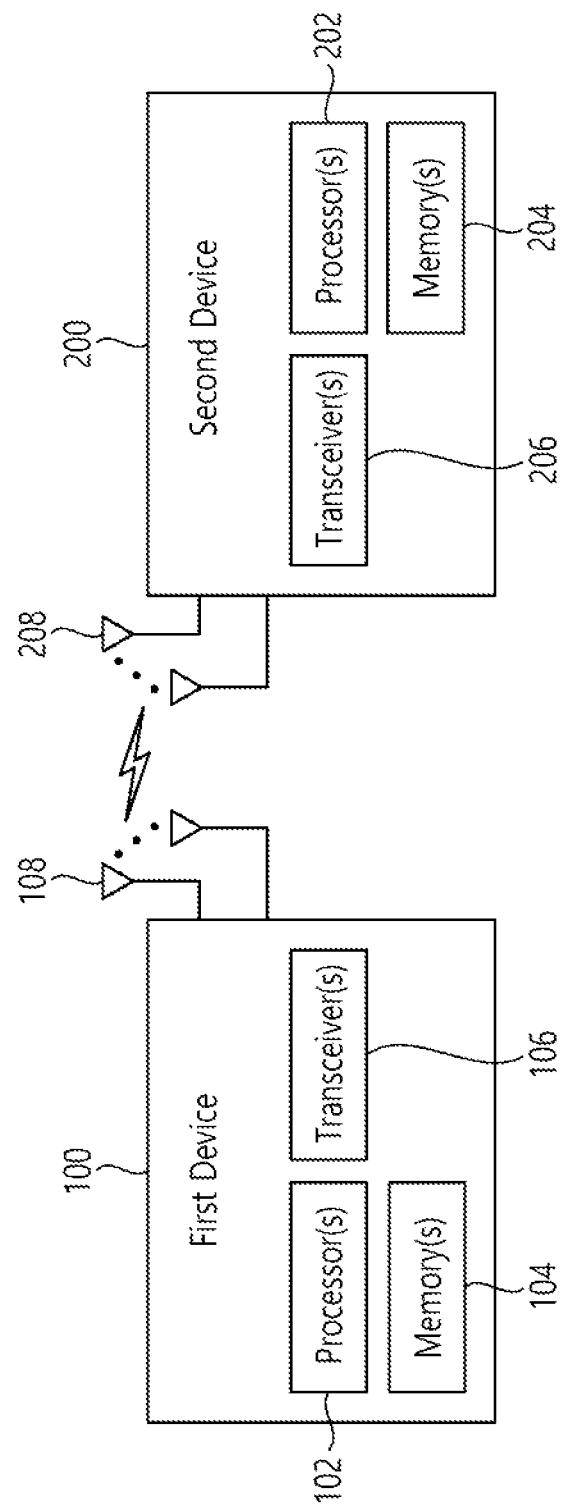
FIG. 10 illustrates a wireless device that is applicable to the disclosure.

Hereinafter, an example of a wireless device to which the disclosure is applied is described. FIG. 10 illustrates a wireless device that is applicable to the disclosure.

Referring to FIG. 10, a first wireless device 100 and a second wireless device 200 may transmit and receive radio signals through various radio access technologies (e.g., LTE and NR). Here, the first wireless device 100 and the second wireless device 200 may respectively correspond to a wireless device 100x and the base station 200 of FIG. 9 and/or may respectively correspond to a wireless device 100x and a wireless device 100x of FIG. 9.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In the disclosure, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In the disclosure, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 11:
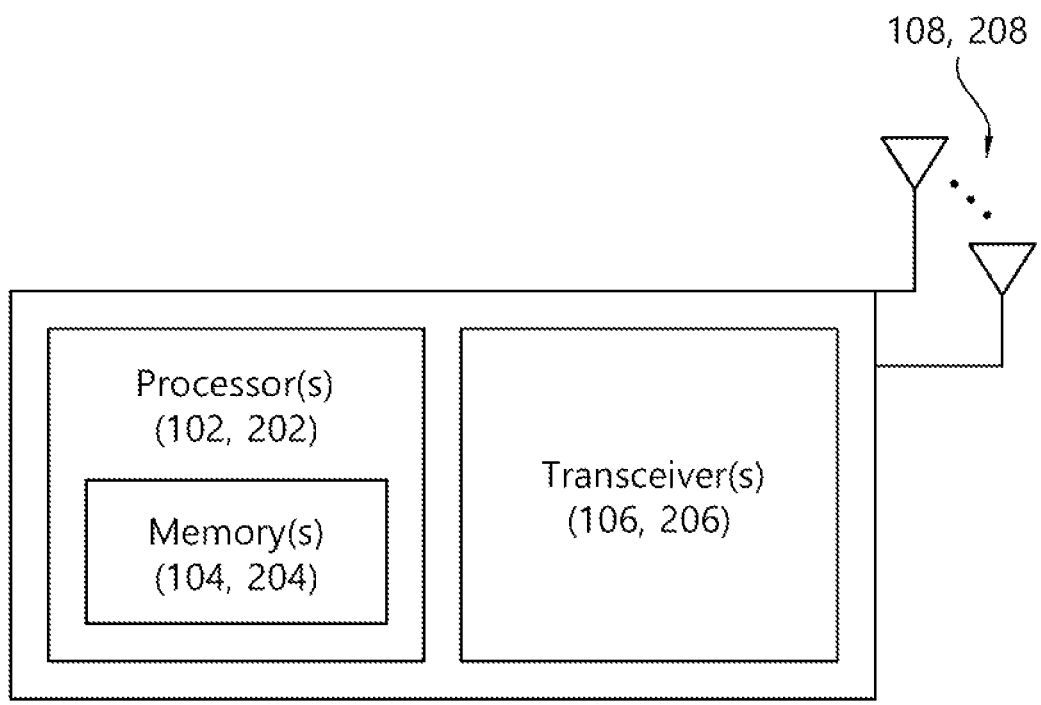
FIG. 11 illustrates another example of a wireless device applicable to the present disclosure.

FIG. 11 illustrates another example of a wireless device applicable to the present disclosure.

Referring to FIG. 11, a wireless device may include at least one processor 102, 202, at least one memory 104, 204, at least one transceiver 106, 206, and one or more antennas 108, 208.

As a difference between the example of the wireless device described above in FIG. 10 and the example of the wireless device in FIG. 11, the processors 102 and 202 and the memories 104 and 204 are separated in FIG. 10, and the processors 102 and 202 include the memories 104 and 204 in FIG. 11.

Here, the specific description of the processor 102, 202, the memory 104, 204, the transceiver 106, 206, and one or more antennas 108, 208 is same as described above, repeated descriptions will be omitted in order to avoid unnecessary repetition of descriptions.

Hereinafter, an example of a signal processing circuit to which the disclosure is applied is described.

Figure 12:
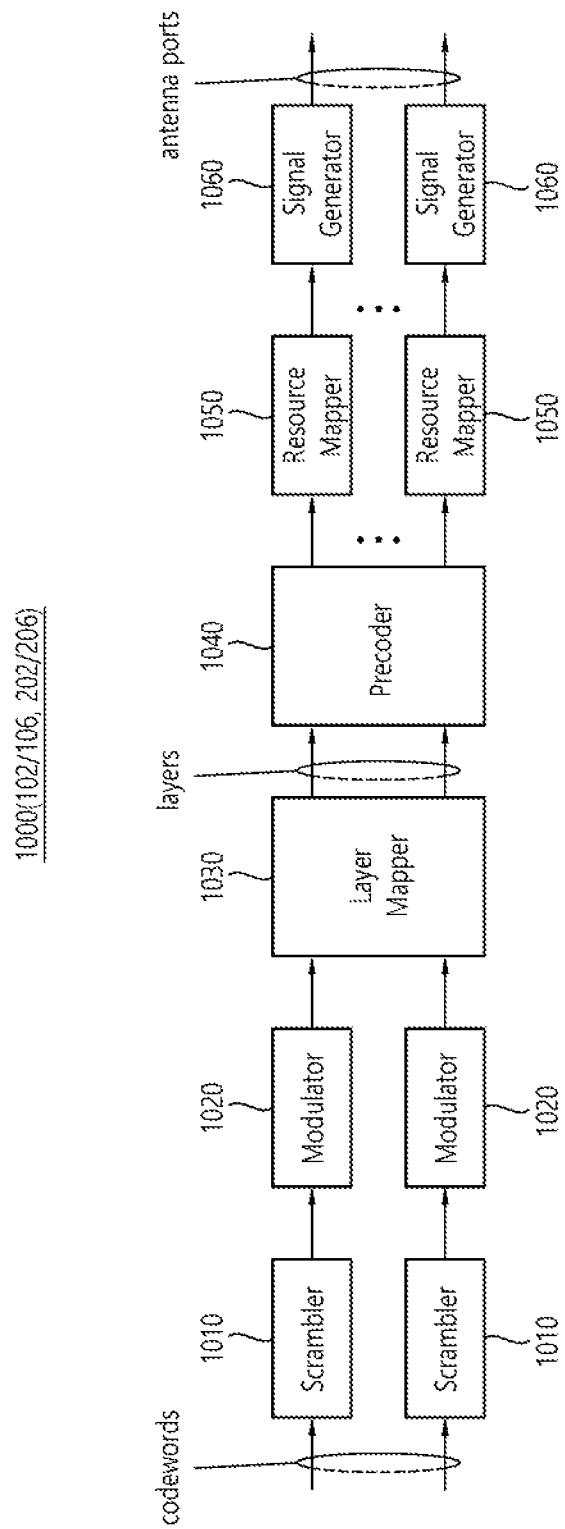
FIG. 12 illustrates a signal processing circuit for a transmission signal.

FIG. 12 illustrates a signal processing circuit for a transmission signal.

Referring to FIG. 12, the signal processing circuit 1000 may include a scrambler 1010, a modulator 1020, a layer mapper 1030, a precoder 1040, a resource mapper 1050, and a signal generator 1060. Operations/functions illustrated with reference to FIG. 12 may be performed, but not limited to, in the processor 102 and 202 and/or the transceiver 106 and 206 of FIG. 10. Hardware elements illustrated in FIG. 12 may be configured in the processor 102 and 202 and/or the transceiver 106 and 206 of FIG. 10. For example, blocks 1010 to 1060 may be configured in the processor 102 and 202 of FIG. 10. Alternatively, blocks 1010 to 1050 may be configured in the processor 102 and 202 of FIG. 10, and a block 1060 may be configured in the transceiver 106 and 206 of FIG. 10.

A codeword may be converted into a radio signal via the signal processing circuit 1000 of FIG. 12. Here, the codeword is an encoded bit sequence of an information block. The information block may include a transport block (e.g., a UL-SCH transport block and a DL-SCH transport block). The radio signal may be transmitted through various physical channels (e.g., a PUSCH or a PDSCH).

Specifically, the codeword may be converted into a scrambled bit sequence by the scrambler 1010. A scrambled sequence used for scrambling is generated on the basis of an initialization value, and the initialization value may include ID information about a wireless device. The scrambled bit sequence may be modulated into a modulation symbol sequence by the modulator 1020. A modulation scheme may include pi/2-binary phase shift keying (pi/2-BPSK), m-phase shift keying (m-PSK), m-quadrature amplitude modulation (m-QAM), and the like. A complex modulation symbol sequence may be mapped to at least one transport layer by the layer mapper 1030. Modulation symbols of each transport layer may be mapped to a corresponding antenna port(s) by the precoder 1040 (precoding). Output z from the precoder 1040 may be obtained by multiplying output y from the layer mapper 1030 by a precoding matrix W of N*M, where N is the number of antenna ports, and M is the number of transport layers. Here, the precoder 1040 may perform precoding after performing transform precoding (e.g., DFT transform) on complex modulation symbols. Alternatively, the precoder 1040 may perform precoding without performing transform precoding.

The resource mapper 1050 may map a modulation symbol of each antenna port to a time-frequency resource. The time-frequency resource may include a plurality of symbols (e.g., CP-OFDMA symbols or DFT-s-OFDMA symbols) in the time domain and may include a plurality of subcarriers in the frequency domain. The signal generator 1060 may generate a radio signal from mapped modulation symbols, and the generated radio signal may be transmitted to another device through each antenna. To this end, the signal generator 1060 may include an inverse fast Fourier transform (IFFT) module, a cyclic prefix (CP) inserter, a digital-to-analog converter (DAC), a frequency upconverter, and the like.

A signal processing procedure for a received signal in a wireless device may be performed in the reverse order of the signal processing procedure 1010 to 1060 of FIG. 12. For example, a wireless device (e.g., 100 and 200 of FIG. 10) may receive a radio signal from the outside through an antenna port/transceiver. The received radio signal may be converted into a baseband signal through a signal reconstructor. To this end, the signal reconstructor may include a frequency downconverter, an analog-to-digital converter (ADC), a CP remover, and a fast Fourier transform (FFT) module. The baseband signal may be reconstructed to a codeword through resource demapping, postcoding, demodulation, and descrambling. The codeword may be reconstructed to an original information block through decoding. Thus, a signal processing circuit (not shown) for a received signal may include a signal reconstructor, a resource demapper, a postcoder, a demodulator, a descrambler and a decoder.

Hereinafter, an example of utilizing a wireless device to which the disclosure is applied is described.

Figure 13:
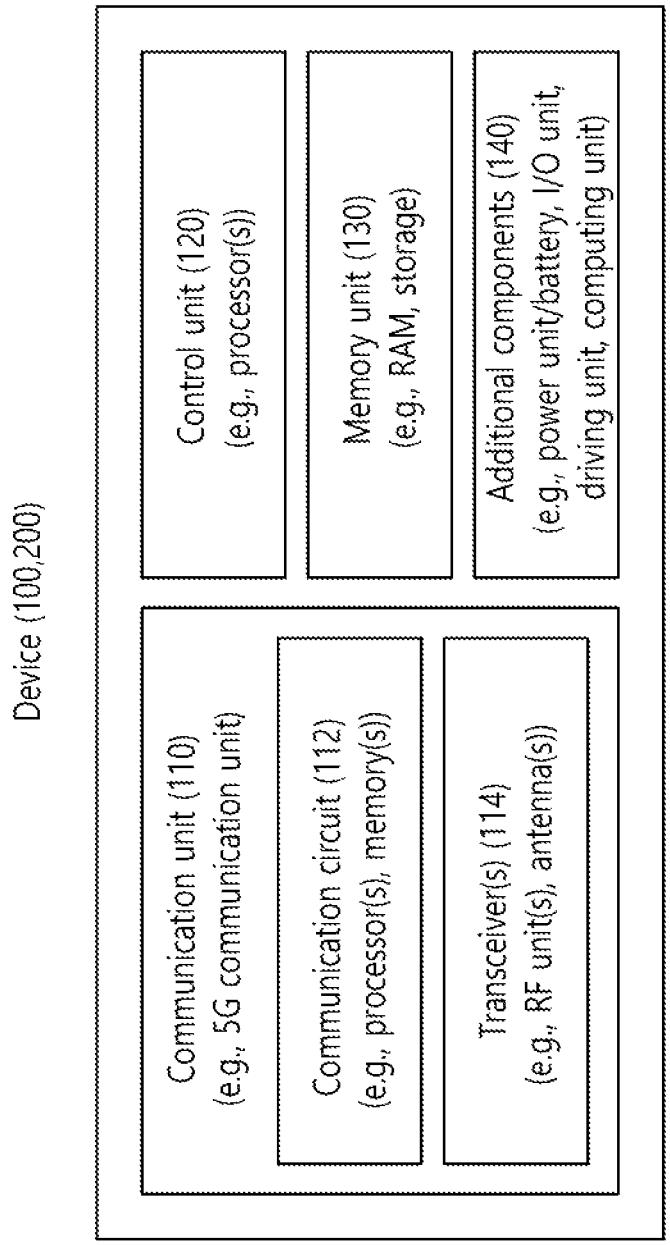
FIG. 13 illustrates another example of a wireless device applied to the disclosure.

FIG. 13 illustrates another example of a wireless device applied to the disclosure. The wireless device may be configured in various forms depending on usage/service.

Referring to FIG. 13, the wireless devices 100 and 200 may correspond to the wireless device 100 and 200 of FIG. 10 and may include various elements, components, units, and/or modules. For example, the wireless device 100 and 200 may include a communication unit 110, a control unit 120, a memory unit 130, and additional components 140. The communication unit may include a communication circuit 112 and a transceiver(s) 114. For example, the communication circuit 112 may include the at least one processor 102 and 202 and/or the at least one memory 104 and 204 of FIG. 10. For example, the transceiver(s) 114 may include the at least one transceiver 106 and 206 and/or the at least one antenna 108 and 208 of FIG. 10. The control unit 120 is electrically connected to the communication unit 110, the memory unit 130, and the additional components 140 and controls overall operations of the wireless device. For example, the control unit 120 may control electrical/mechanical operations of the wireless device on the basis of a program/code/command/information stored in the memory unit 130. In addition, the control unit 120 may transmit information stored in the memory unit 130 to the outside (e.g., a different communication device) through a wireless/wired interface via the communication unit 110 or may store, in the memory unit 130, information received from the outside (e.g., a different communication device) through the wireless/wired interface via the communication unit 110.

The additional components 140 may be configured variously depending on the type of the wireless device. For example, the additional components 140 may include at least one of a power unit/battery, an input/output (I/O) unit, a driving unit, and a computing unit. The wireless device may be configured, but not limited to, as a robot (100a in FIG. 9), a vehicle (100 b-1 or 100 b-2 in FIG. 9), an XR device (100 c in FIG. 9), a hand-held device (100 d in FIG. 9), a home appliance (100e in FIG. 9), an IoT device (100f in FIG. 9), a terminal for digital broadcasting, a hologram device, a public safety device, an MTC device, a medical device, a fintech device (or financial device), a security device, a climate/environmental device, an AI server/device (400 in FIG. 9), a base station (200 in FIG. 9), a network node, or the like. The wireless device may be mobile or may be used in a fixed place depending on usage/service.

In FIG. 13, all of the various elements, components, units, and/or modules in the wireless devices 100 and 200 may be connected to each other through a wired interface, or at least some thereof may be wirelessly connected through the communication unit 110. For example, the control unit 120 and the communication unit 110 may be connected via a cable in the wireless device 100 and 200, and the control unit 120 and a first unit (e.g., 130 and 140) may be wirelessly connected through the communication unit 110. In addition, each element, component, unit, and/or module in wireless device 100 and 200 may further include at least one element. For example, the control unit 120 may include at least one processor set. For example, the control unit 120 may be configured as a set of a communication control processor, an application processor, an electronic control unit (ECU), a graphics processing processor, a memory control processor, and the like. In another example, the memory unit 130 may include a random-access memory (RAM), a dynamic RAM (DRAM), a read-only memory (ROM), a flash memory, a volatile memory, a non-volatile memory, and/or a combination thereof.

Next, an illustrative configuration of FIG. 13 is described in detail with reference to the accompanying drawing.

Figure 14:
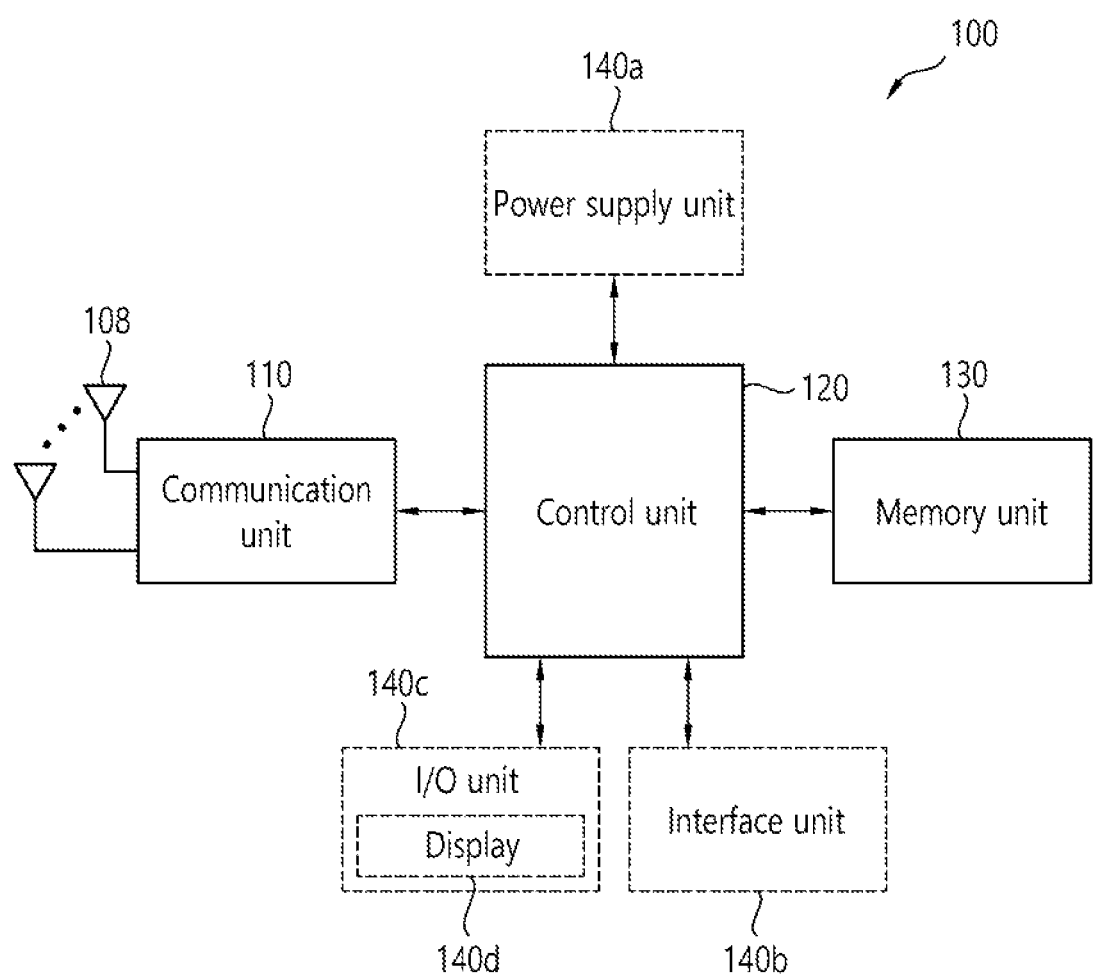
FIG. 14 illustrates a hand-held device applied to the disclosure.

FIG. 14 illustrates a hand-held device applied to the disclosure. The hand-held device may include a smartphone, a smartpad, a wearable device (e.g., a smart watch or smart glasses), and a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 14, the hand-held device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. Blocks 110 to 130/140a to 140c correspond to the blocks 110 to 130/140 in FIG. 13, respectively.

The communication unit 110 may transmit and receive a signal (e.g., data, a control signal, or the like) to and from other wireless devices and base stations. The control unit 120 may control various components of the hand-held device 100 to perform various operations. The control unit 120 may include an application processor (AP). The memory unit 130 may store data/parameter/program/code/command necessary to drive the hand-held device 100. Further, the memory unit 130 may store input/output data/information. The power supply unit 140a supplies power to the hand-held device 100 and may include a wired/wireless charging circuit, a battery, and the like. The interface unit 140b may support a connection between the hand-held device 100 and a different external device. The interface unit 140b may include various ports (e.g., an audio input/output port and a video input/output port) for connection to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in data communication, the input/output unit 140c may obtain information/signal (e.g., a touch, text, voice, an image, and a video) input from the user, and the obtained information/signal may be stored in the memory unit 130. The communication unit 110 may convert information/signal stored in the memory unit into a radio signal and may transmit the converted radio signal directly to a different wireless device or to a base station. In addition, the communication unit 110 may receive a radio signal from a different wireless device or the base station and may reconstruct the received radio signal to original information/signal. The reconstructed information/signal may be stored in the memory unit 130 and may then be output in various forms (e.g., text, voice, an image, a video, and a haptic form) through the input/output unit 140c.

Figure 15:
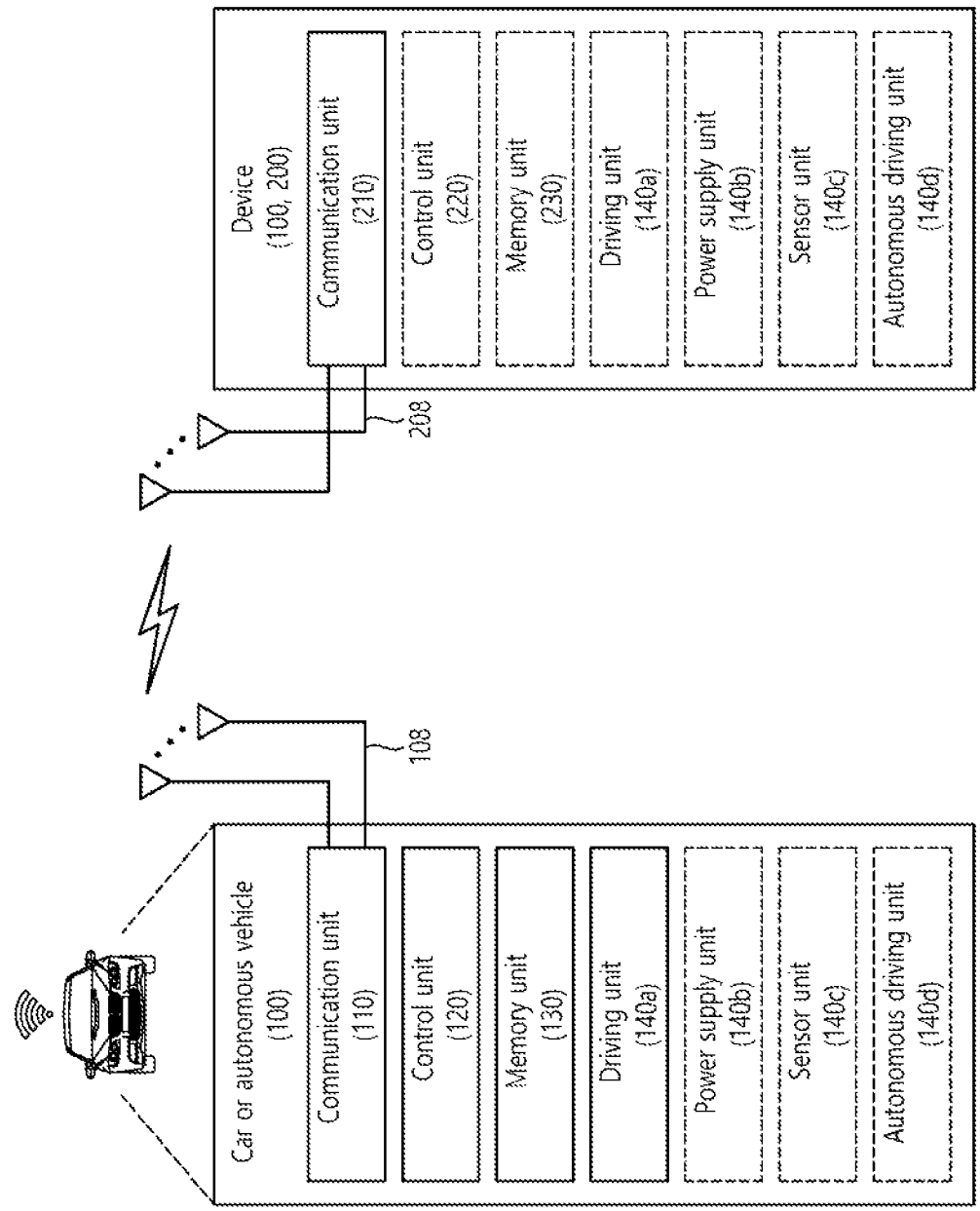
FIG. 15 illustrates a vehicle or an autonomous driving vehicle applied to the disclosure.

FIG. 15 illustrates a vehicle or an autonomous driving vehicle applied to the disclosure. The vehicle or the autonomous driving may be configured as a mobile robot, a car, a train, a manned/unmanned aerial vehicle (AV), a ship, or the like.

Referring to FIG. 15, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 13, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140*b* supplies power to the vehicle or the autonomous driving vehicle 100 and may include a wired/wireless charging circuit, a battery, and the like. The sensor unit 140*c* may obtain a vehicle condition, environmental information, user information, and the like. The sensor unit 140*c* may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140*d* may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140*d* may generate an autonomous driving route and a driving plan on the basis of obtained data. The control unit 120 may control the driving unit 140*a* to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140*c* may obtain a vehicle condition and environmental information. The autonomous driving unit 140*d* may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

In what follows, Discontinuous Reception (DRX) will be described.

Discontinuous Reception (DRX) refers to an operation mode in which a UE reduces battery consumption to receive a downlink channel in a discontinuous manner. In other words, a UE configured for DRX may reduce power consumption by receiving a DL signal discontinuously.

A DRX operation is performed within a DRX cycle representing a time interval in which On Duration is repeated periodically. A DRX cycle includes On Duration and Sleep Duration (or an occasion of DRX). On Duration refers to a time interval in which a UE monitors a PDCCH to receive the PDCCH.

DRX may be performed in the Radio Resource Control (RRC)_IDLE state (or mode), RRC_INACTIVE state (or mode) or RRC_CONNECTED state (or mode). In the RRC_IDLE state and RRC_INACTIVE state, DRX may be used to receive a paging signal discontinuously.

RRC_IDLE state: The state in which a radio connection (RRC connection) is not established between a base station and a UE.

RRC_INACTIVE state: The state in which, although a radio connection (RRC connection) has been established between the base station and the UE, the radio connection is deactivated.

RRC_CONNECTED state: The state in which a radio connection (RRC connection) is established between the base station and the UE.

DRX may be basically divided into idle mode DRX, Connected DRX (C-DRX), and extended DRX.

DRX applied in the IDLE state may be referred to as idle mode DRX, and DRX applied in the CONNECTED state may be referred to as Connected mode DRX (C-DRX).

Extended/Enhanced DRX (eDRX) is a mechanism that may extend the cycle of the idle mode DRX and C-DRX and may be mostly used for (passive) IoT applications. In the idle mode DRX, whether to allow eDRX may be configured based on system information (for example, SIB1). SIB1 may include an eDRX-allowed parameter. The eDRX-allowed parameter represents whether extended DRX is allowed in the idle mode.

In what follows, idle mode DRX is described.

In the idle mode, the UE may use DRX to reduce power consumption. One paging occasion (PO) is a subframe in which Paging-Radio Network Temporary Identifier (P-RNTI) may be transmitted on a Physical Downlink Control Channel (PDCCH) or an MTC PDCCH (MPDCCH) or a Narrowband PDCCH (NPDCCH) (addressing a paging message for NB-IoT).

In the P-RNTI transmitted on the MPDCCH, PO may represent a starting subframe of MPDCCH repetitions. In the case of P-RNTI transmitted on the NPDCCH, when a subframe determined by PO is not a valid NB-IoT downlink subframe, PO may represent a starting subframe of NPDCCH repetitions. Therefore, the first valid NB-IoT downlink subframe after PO is the starting subframe of NPDCCH repetitions.

One Paging Frame (PF) is one radio frame, which may contain one or a plurality of POs. When DRX is used, the UE only needs to monitor one PO per DRX cycle. One Paging Narrowband (PNB) is one narrowband, on which the UE performs reception of a paging message. PF, PO, and PNB are determined based on the DRX parameters provided in System Information.

Figure 16:
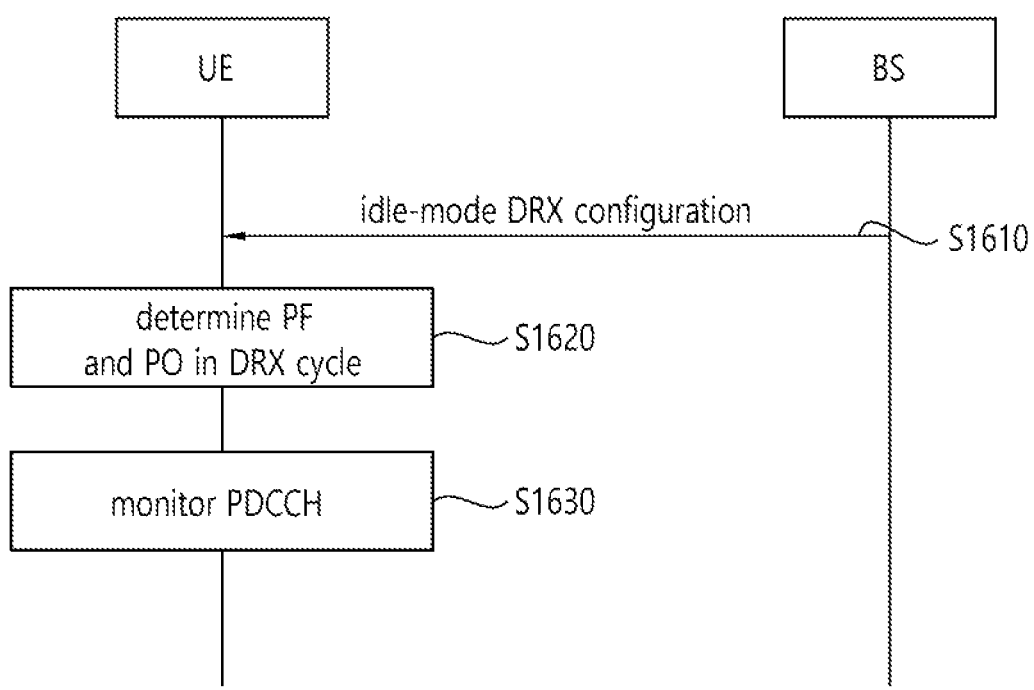
FIG. 16 is a flow diagram illustrating one example in which an idle mode DRX operation is performed.

FIG. 16 is a flow diagram illustrating one example in which an idle mode DRX operation is performed.

According to FIG. 16, the UE may receive idle mode DRX configuration information from a base station through upper layer signaling (for example, system information) S1610.

The UE may determine the Paging Frame (PF) and Paging Occasion (PO) to monitor a PDCCH in a paging DRX cycle based on the idle mode DRX configuration information S1620. In this case, the DRX cycle may include On Duration and Sleep Duration (or an occasion of DRX).

The UE may monitor the PDCCH at the PO of a determined PF S1630. In this case, for example, the UE monitors only one subframe (PO) per paging DRX cycle. Also, if the UE receives a PDCCH scrambled by P-RNTI during the On Duration (namely, when paging is detected), the UE may transition to the connected mode and transmit and receive data to and from the base station.

Figure 17:
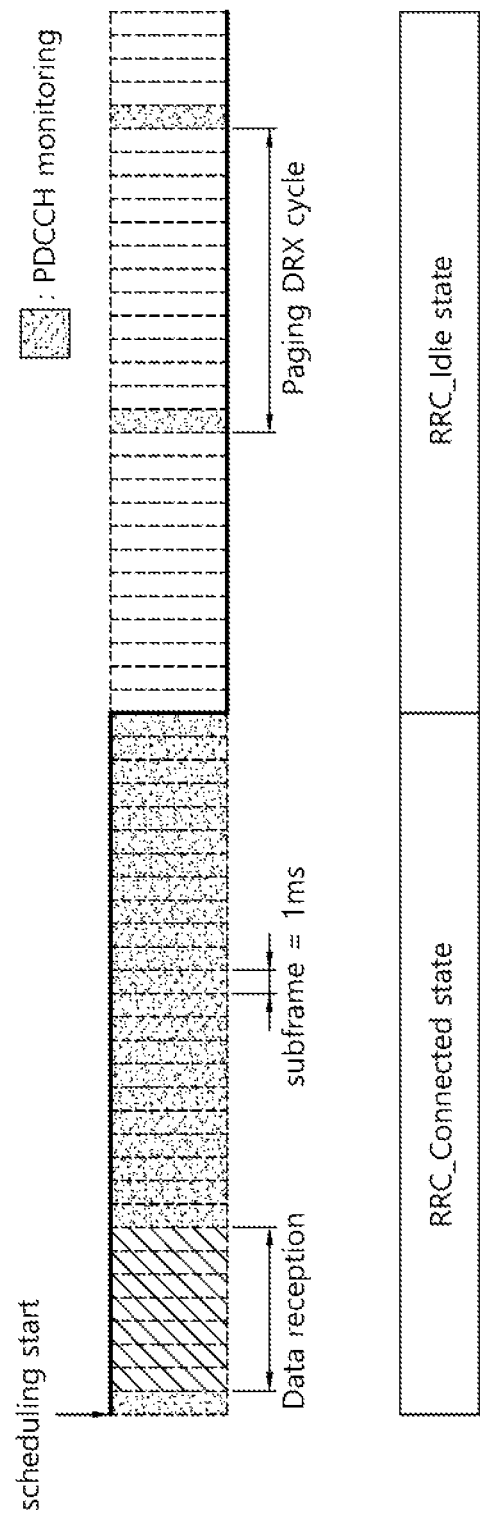
FIG. 17 illustrates one example of an idle mode DRX operation.

FIG. 17 illustrates one example of an idle mode DRX operation.

According to FIG. 17, when there exists traffic directed toward the UE in the RRC_IDLE state (hereinafter, referred to as 'idle state'), paging is generated with respect to the corresponding UE. The UE may wake up periodically (namely, every (paging) DRX periods) to monitor a PDCCH. In the absence of paging, the UE may transition to the connected state, receive data, and enter the sleep mode again if there exists no data.

In what follows, Connected mode DRX (C-DRX) is described.

C-DRX refers to DRX applied in the RRC connected state. The DRX cycle for C-DRX may be composed of a short DRX cycle and/or a long DRX cycle. Here, a short DRX cycle may be selected optionally.

When C-DRX is configured, the UE may perform PDCCH monitoring with respect to On Duration. If a PDCCH is successfully detected during PDCCH monitoring, the UE operates (or runs) an inactive timer and maintain the timer in the awake state. On the other hand, if a PDCCH is not detected successfully during PDCCH monitoring, the UE may enter the sleep state after the On Duration expires.

When C-DRX is configured, a PDCCH reception occasion (for example, a slot having PDCCH search space) may be configured to be discontinuous based on the C-DRX configuration. On the other hand, if C-DRX is not configured, the PDCCH reception occasion (for example, a slot having PDCCH search space) may be configured to be continuous according to the present disclosure.

Meanwhile, PDCCH monitoring may be limited to a time interval configured in terms of a measurement gap regardless of the C-DRX configuration.

Figure 18:
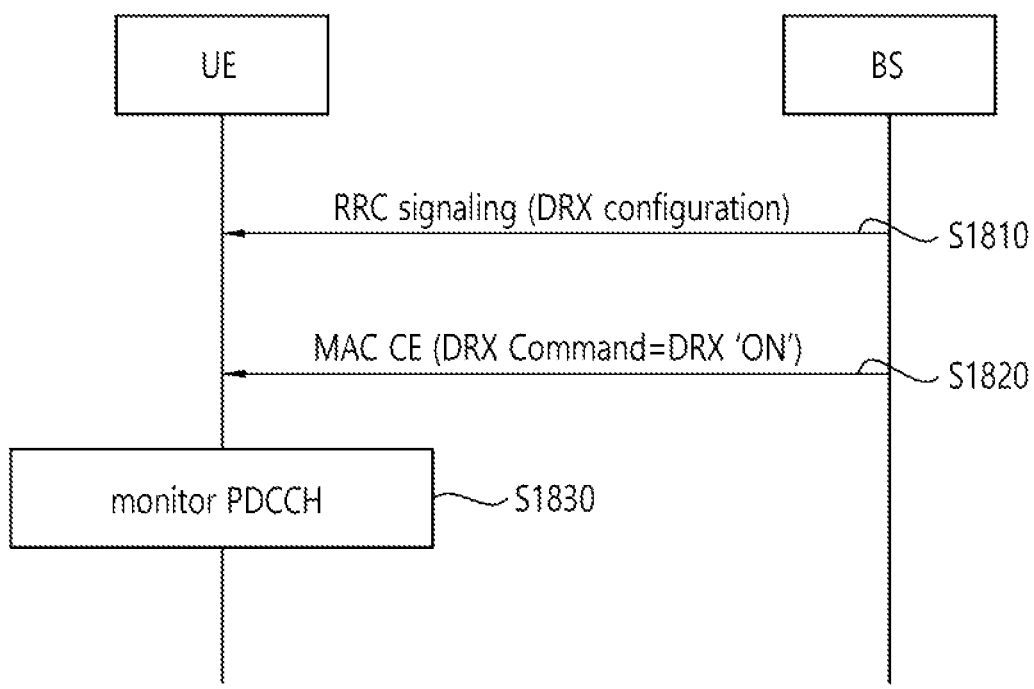
FIG. 18 is a flow diagram illustrating one example of a method for performing a C-DRX operation.

FIG. 18 is a flow diagram illustrating one example of a method for performing a C-DRX operation.

The UE may receive RRC signaling (for example, MAC-MainConfig IE) including DRX configuration information from a base station S1810.

Here, DRX configuration information may include the following information.

onDurationTimer: The number of PDCCH subframes to be monitored continuously from the starting position of a DRX cycle.

drx-InactivityTimer: The number of PDCCH subframes to be monitored continuously when the UE decodes a PDCCH having scheduling information.

drx-RetransmissionTimer: The number of PDCCH subframes to be monitored continuously when HARQ retransmission is expected.

longDRX-Cycle: The period during which On Duration is generated.

drxStartOffset: The subframe number at which a DRX cycle is started.

drxShortCycleTimer: The short DRX cycle number shortDRX-Cycle: A DRX cycle operating as many times as the number of drxShortCycleTimers when the Drx-InactivityTimer expires.

Also, when DRX 'ON' is configured by the DRX command of the MAC Command Element (CE) S1820, the UE monitors the PDCCH with respect to the On Duration of the DRX cycle based on the DRX configuration S1830.

Figure 19:
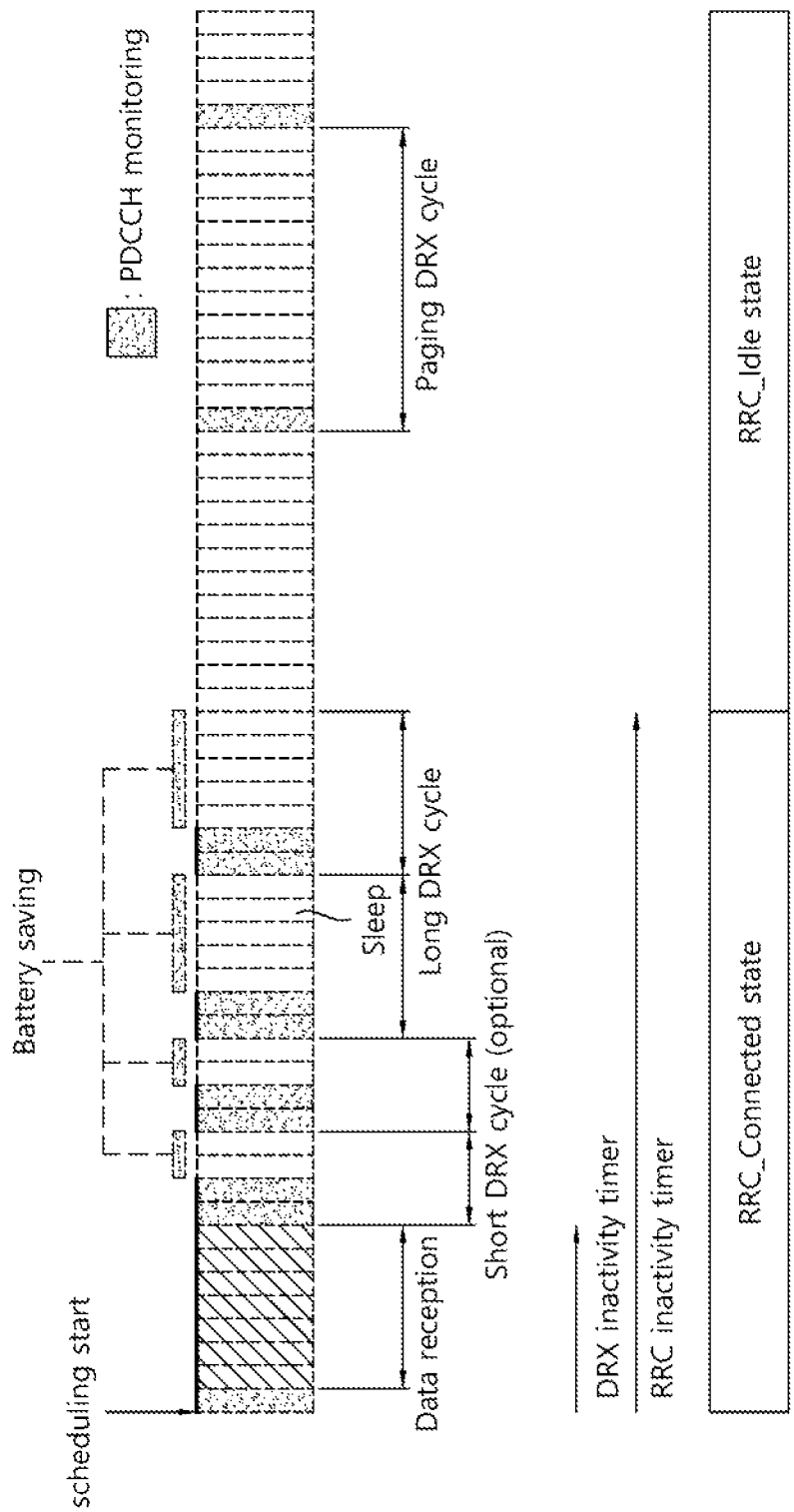
FIG. 19 illustrates an example of a C-DRX operation.

FIG. 19 illustrates an example of a C-DRX operation.

If the UE receives scheduling information (for example, a DL grant) in the RRC_CONNECTED state (in what follows, referred to as connected state), the UE may execute the DRX inactive timer and the RRC inactive timer.

When the DRX inactive timer expires, the DRX mode may be started. The UE may wake up from the DRX cycle and monitor the PDCCH for a predetermined time period (on the duration timer).

In this case, when short DRX is configured and the UE starts the DRX mode, the UE first starts with a short DRX cycle and after the short DRX cycle is completed, starts a long DRX cycle. Here, the long DRX cycle may correspond to a multiple of the short DRX cycle. Moreover, during the short DRX cycle, the UE may wake up more often. After the RRC inactive timer expires, the UE may transition to the IDLE state and perform the IDLE mode DRX operation.

Hereinafter, proposals of the present disclosure will be described.

Additional advantages, objects and features of the present disclosure will be set forth in part in the description that follows. Also, it will be apparent to or partially learning from the practice of the present disclosure to those skilled in the art upon review of the following. The objects and other advantages of the present disclosure may be realized and attained by means of the appended drawings as well as the appended claims and the structures particularly pointed out in the claims.

In the NR system, a plurality of (e.g., up to 4) BWPs (bandwidth parts) may be configured for each serving cell, and the dormant state in the NR system is considering operation in units of BWP. Accordingly, a dormancy operation for each cell and/or BWP needs to be defined.

Hereinafter, embodiments of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

Figure 20:
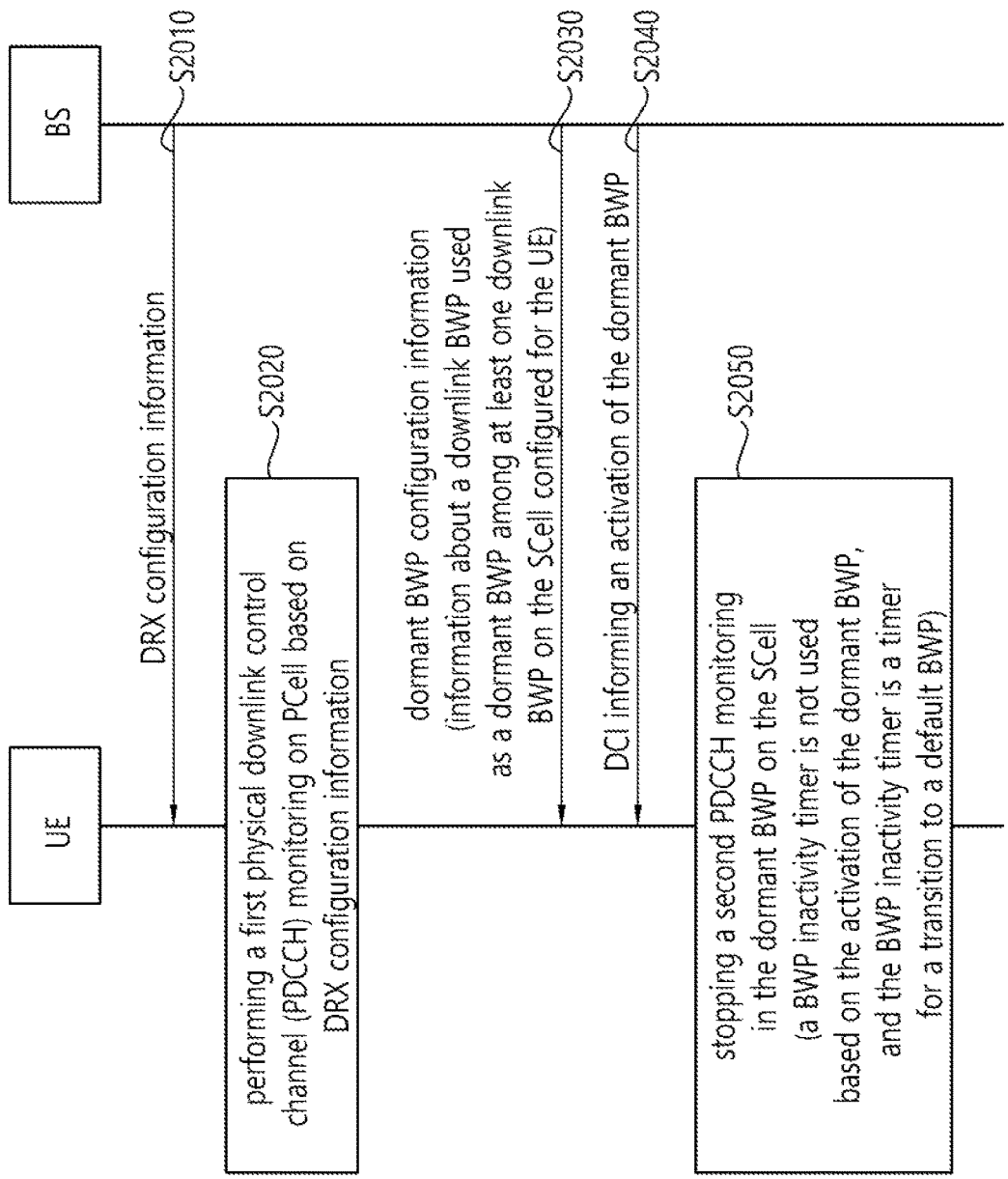
FIG. 20 is a flowchart of a DRX operation method according to an embodiment of the present disclosure.

FIG. 20 is a flowchart of a DRX operation method according to an embodiment of the present disclosure.

Referring to FIG. 20, the terminal may receive DRX configuration information from a base station (S2010). Specific examples for this are the same as described above, and thus repeated description will be omitted. Here, a primary cell (PCell) and a secondary cell (SCell) may be configured to the terminal.

The terminal may perform first physical downlink control channel (PDCCH) monitoring on the PCell based on the DRX configuration information (S2020). Specific examples for this are the same as described above, and thus repeated description will be omitted.

The terminal may receive dormant BWP configuration information from the base station (S2030). Here, the dormant BWP configuration information may be information on a downlink BWP used as a dormant BWP on the SCell among at least one downlink BWP configured for the terminal.

As an example, dormant BWP configuration information received by the terminal may be, for example, 'dormantBWP-Id'. Here, the dormant BWP configuration information may include identification information of the downlink BWP used as the dormant BWP. In this case, the identification information of the dormant BWP may be different from the identification information of the default BWP (in other words, the dormant BWP may be a different BWP from the default BWP).

In addition, as an example, dormant BWP configuration information received by the terminal may be transmitted through higher layer signaling (e.g., RRC signaling).

The terminal may receive from the base station downlink control information (DCI) indicating activation of the dormant BWP (S2040).

As an example, DCI may include, for example, a bandwidth part indicator field. Here, as an example, the bandwidth part indication field included in DCI may indicate an active downlink BWP among configured downlink BWPs.

Since the dormant BWP corresponds to a type of downlink BWP, the active dormant BWP may also be indicated from the bandwidth part indication field.

In addition, as an example, DCI may correspond to, for example, DCI format 1_1 or DCI format 1_2, and DCI may be transmitted through L1 signaling.

The terminal may stop monitoring the second physical downlink control channel (PDCCH) on the dormant BWP on the SCell (S2050). Here, the BWP inactivity timer is not used based on the activation of the dormant BWP, and the BWP inactivity timer may be a timer for transition to the default BWP.

As an example, the terminal may receive information about the value of the BWP inactivity timer from the base station. In this case, the information received by the terminal may be, for example, 'bwp-InactivityTimer'.

Here, for example, when the duration for the value of the BWP inactivity timer elapses, the terminal may fall back to the default BWP. In other words, when the BWP inactivity timer expires, the terminal may transition from the current BWP to the default BWP.

For example, if the network releases configuration information for the BWP inactivity timer, the terminal may stop the timer without switching to the default BWP.

Meanwhile, in this embodiment, as an example, the terminal may continue to perform CSI (channel state information) measurement on the dormant BWP. A specific example of this will be described later (or as described above), and thus repeated description will be omitted.

For example, the default BWP may be a BWP to which the terminal transitions when the BWP inactivity timer expires. A specific example of this will be described later (or as described above), and thus repeated description will be omitted.

For example, the dormant BWP may be a different BWP from the default BWP. Here, on the basis that the dormant BWP is not the default BWP, the BWP inactivity timer may not be used. A specific example of this will be described later (or as described above), and thus repeated description will be omitted.

As an example, based on the activation of the dormant BWP and running of the BWP inactivity timer, the terminal may stop the BWP inactivity timer. A specific example of this will be described later (or as described above), and thus repeated description will be omitted.

For example, based on the release of the BWP inactivity timer, the terminal may stop the BWP inactivity timer without transitioning to the default BWP. A specific example of this will be described later (or as described above), and thus repeated description will be omitted.

For example, the at least one downlink BWP may be a downlink BWP for a secondary cell (SCell). Here, the at least one BWP may include the dormant BWP. Here, the at least one BWP may include the default BWP. A specific example of this will be described later (or as described above), and thus repeated description will be omitted.

Hereinafter, embodiments of the present specification will be described in more detail.

In the LTE system, a dormant state is defined to quickly perform activation/deactivation of a secondary cell (hereinafter referred to as SCell). When a specific SCell is set to a dormant state, the UE may not perform PDCCH monitoring for the corresponding cell. Thereafter, in order to quickly activate the corresponding SCell, it is defined to monitor the channel condition and link status of a corresponding cell by performing measurement and report in the dormant state. For example, when a specific SCell is set to a dormant state, the UE does not perform PDCCH monitoring, but may perform measurement and reporting for CSI/RRM.

In the NR system, a plurality of (e.g., up to 4) BWPs (bandwidth parts) may be configured for each serving cell, and the dormant state in the NR system is considering operation in units of BWP. Accordingly, a dormancy operation for each cell and/or BWP needs to be defined.

Method 1) State Change

The network may indicate a transition to a dormant state for a specific BWP, and the UE may not perform a part or all of the PDCCH monitoring configured in the BWP indicated to transition to the dormant state.

Method 2) Dormant BWP

The network may designate a specific BWP as a dormant BWP. For example, the BWP having a bandwidth of 0 may be configured, the minimum PDCCH monitoring may be indicated through the BWP configuration, or the PDCCH monitoring may not be indicated (by not indicating the SS set configuration).

In summary, in the NR system, a plurality of BWPs may be configured in one cell, and this may also be the case on the SCell. In other words, a plurality of BWPs may be configured in the SCell.

Herein, some of the plurality of BWPs in the SCell may be configured as dormant BWPs, and others may be configured as default BWPs. In this connection, on the dormant BWP, as described above, the UE may stop monitoring the PDCCH. In contrast, on the dormant BWP, when configured, the UE may continue to perform CSI measurement, automatic gain control (AGC), and/or beam management.

Additionally, the NR system considers a transition between a normal state and a dormant state through L1 signaling (e.g., using DCI) for faster SCell activation/deactivation. For example, the dormancy operation of a specific cell may be activated/deactivated through the following methods.

Method 1) Introduction of Special DCI

A special DCI for indicating dormancy behavior of each SCell may be defined. For example, the UE may be indicated to monitor for a special DCI in the PCell, and the network may determine whether each SCell is dormancy through the special DCI. The dormancy behavior of the SCell may be defined using the above method 1 or 2, etc.

Method 2) Enhancement of BWP Indication Field in DCI

It is possible to extend a BWP indication field of the existing DCI to perform the BWP indication of the corresponding cell and/or a specific SCell(s) (that is, performing a cross-carrier indication for BWP in the existing BWP indication field).

Method 3) BWP Level Cross-Carrier Scheduling

The existing cross-carrier scheduling performs inter-carrier pairing in such a way that each cell indicates whether the corresponding cell is a scheduling/scheduled cell, and in the case of a scheduled cell, each cell indicates a scheduling cell of the corresponding cell. In order to define dormancy behavior for the SCell, a method of indicating whether cross-carrier scheduling for each BWP may be considered. For example, in each BWP configuration of the SCell, a scheduling cell that may be indicated to change a state, etc. when the corresponding BWP performs dormancy behavior may be designated. Alternatively, when a dormant BWP is designated, a scheduling cell indicating the dormancy behavior of the corresponding BWP in the corresponding BWP configuration may be designated.

In summary, in the NR system, a method of using DCI for dormant activation/deactivation operation may be provided.

In this connection, a dormant BWP among a plurality of BWPs on the SCell may be activated/deactivated through DCI.

As stated above, various methods are being discussed to implement SCell fast activation/deactivation and dormancy behavior in NR. When the above methods are used, additional considerations may be as follows.

Issue 1) Default BWP triggered by BWP inactivity timer
Issue 2) Scheduling information within a DCI triggering dormancy behavior
Issue 3) HARQ feedback of a DCI triggering dormancy behavior Each issue and solution are discussed below.

In the present specification, D-BWP may mean a BWP performing dormancy behavior, and N-BWP may mean a BWP performing an existing BWP operation as a normal BWP. In addition, in the present disclosure, dormant behavior in a certain BWP does not receive PDCCH in the corresponding BWP or receives it at a longer period than normal behavior, or does not receive PDSCH/PUSCH scheduling for the corresponding BWP, or it may mean that it is received in a longer period than normal behavior. Similarly, the dormant BWP may mean not receiving PDCCH in the corresponding BWP or receiving it at a longer period than normal BWP, or receiving no PDSCH/PUSCH scheduling for the corresponding BWP or receiving it at a longer period than normal BWP.

Figure 21:
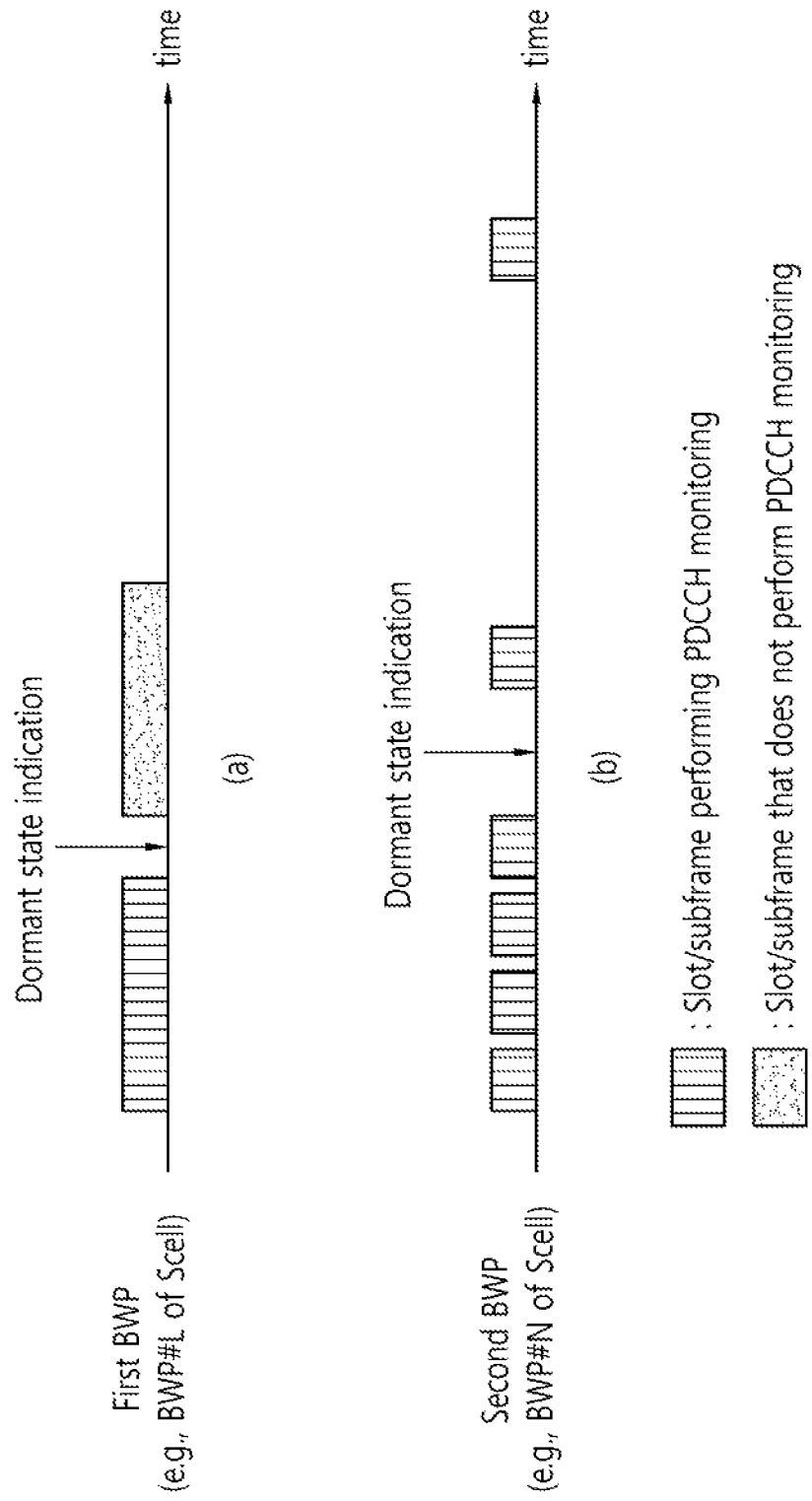
FIG. 21 illustrates dormant behavior.

FIG. 21 illustrates dormant behavior.

As exemplified in FIG. 21(A), the UE may not perform PDCCH monitoring thereafter when receiving a dormant state indication while performing PDCCH monitoring in the first BWP. Alternatively, as exemplified in FIG. 21(B), while performing PDCCH monitoring in a first period in the second BWP, when a dormant state is indicated, thereafter, PDCCH monitoring may be performed in a second period. In this connection, the second period may be longer than the first period.

<Default BWP Triggered by BWP Inactivity Timer>

Figure 22:
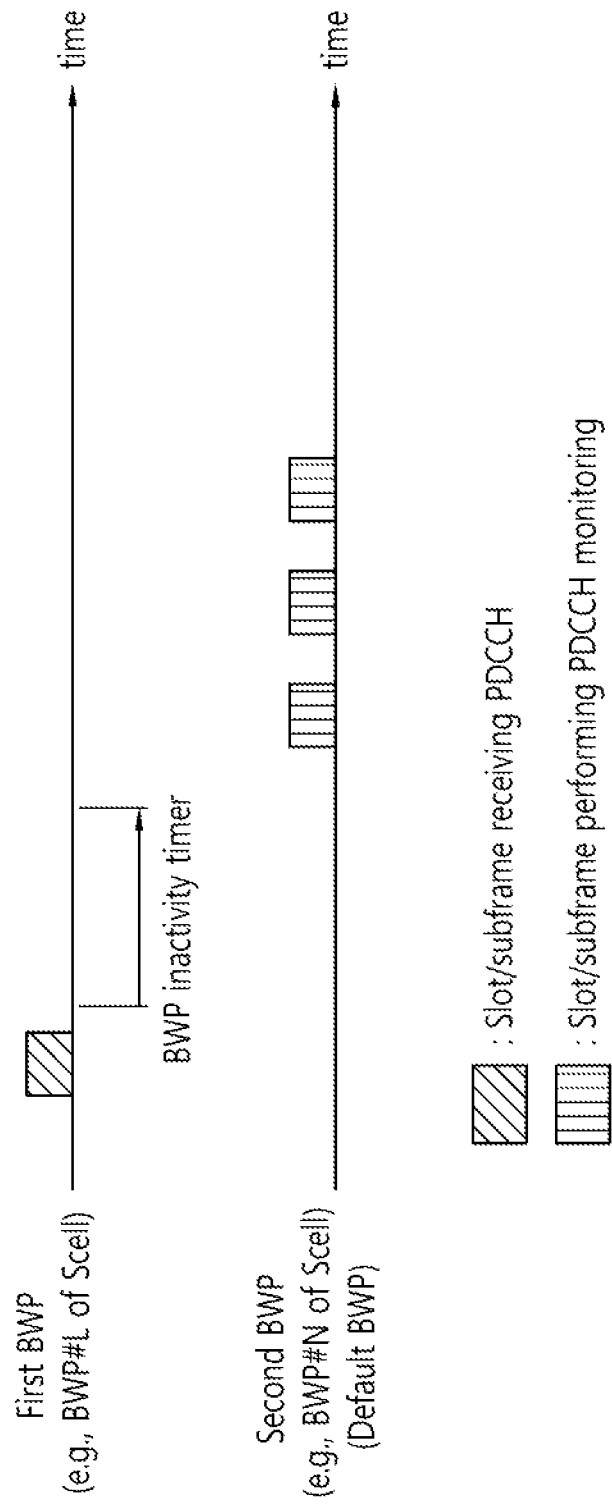
FIG. 22 illustrates an example of the BWP operation of the UE.

FIG. 22 illustrates an example of the BWP operation of the UE.

In the BWP operation of Rel-15, a BWP inactivity timer was introduced to prevent the case of configuring different active BWPs due to misunderstanding between the UE and the network. When the UE does not receive the PDCCH for more than a specific time (specified by the timer) in the active BWP, it may move to the default BWP indicated in advance by the network, and PDCCH monitoring in the default BWP may be performed according to the configured PDCCH monitoring configuration (e.g., CORESET, SS set configuration) for the default BWP. This operation is exemplified in FIG. 22.

When such a default BWP operation and dormancy behavior are performed together, an operation contrary to each purpose may be performed. For example, the network may indicate a specific SCell to move to D-BWP for power saving of the UE, or to change the current BWP to a dormant state. However, the UE that has configured for a BWP inactivity timer may move to the default BWP after a certain period of time to perform PDCCH monitoring.

A simple way to solve this is to consider a method of configuring the default BWP to D-BWP. However, in this case, an additional method is required to solve misunderstanding between the network and the UE, which is the original purpose of the default BWP.

In this regard, the present specification proposes the following method to apply dormancy behavior and BWP inactivity timer together.

When the network indicates the movement to D-BWP, or the current active BWP is switched to the dormant state, the UE ignores the presently configured BWP inactivity timer, or the inactivity timer may be reset as a predefined value or a value indicated by the network (for dormancy behavior).

In summary, according to an embodiment of the present specification, the active dormant BWP and the default BWP may be different BWPs. In addition, when the active dormant BWP is not the default BWP, the BWP inactivity timer may not be used based on the activation of the dormant BWP. In other words, when the active dormant BWP is not the default BWP (even when it is desirable for the UE to be in the dormant BWP for power saving, to prevent the inefficiency of forcibly transitioning to the default BWP by the BWP inactivity timer), based on the activation of the dormant BWP, the BWP inactivity timer, which is a timer for a transition to a default BWP, may not be used.

In addition, as described above, the dormant BWP and the default BWP may be BWPs on the SCell. From this viewpoint, the above description is once again explained as follows. When the active DL BWP indicated (or provided) as dormant BWP for a UE on an activated SCell is not a default BWP for the UE on the activated SCell, the BWP inactivity timer may not be used for a transition from the active DL BWP indicated (or provided) as the dormant BWP to the default DL BWP on the activated SCell.

For example, the network may configure an appropriate dormancy section in consideration of the UE's traffic situation, etc., and may indicate the UE (in advance) of the corresponding value. Thereafter, when the UE is indicated to move to the D-BWP or is indicated to switch the current active BWP to the dormant state, the UE may configure the value indicated by the network as the BWP inactivity timer value. In addition, the inactivity timer for dormancy behavior indicated by the network may operate independently of the existing BWP inactivity timer. For example, the UE indicated for the dormancy behavior may turn off the existing BWP inactivity timer and operate the inactivity timer for the dormancy behavior. Thereafter, when the BWP inactivity timer is terminated or the UE is indicated to move to the N-BWP (or switching to the normal state), the dormancy behavior may be terminated.

Figure 23:
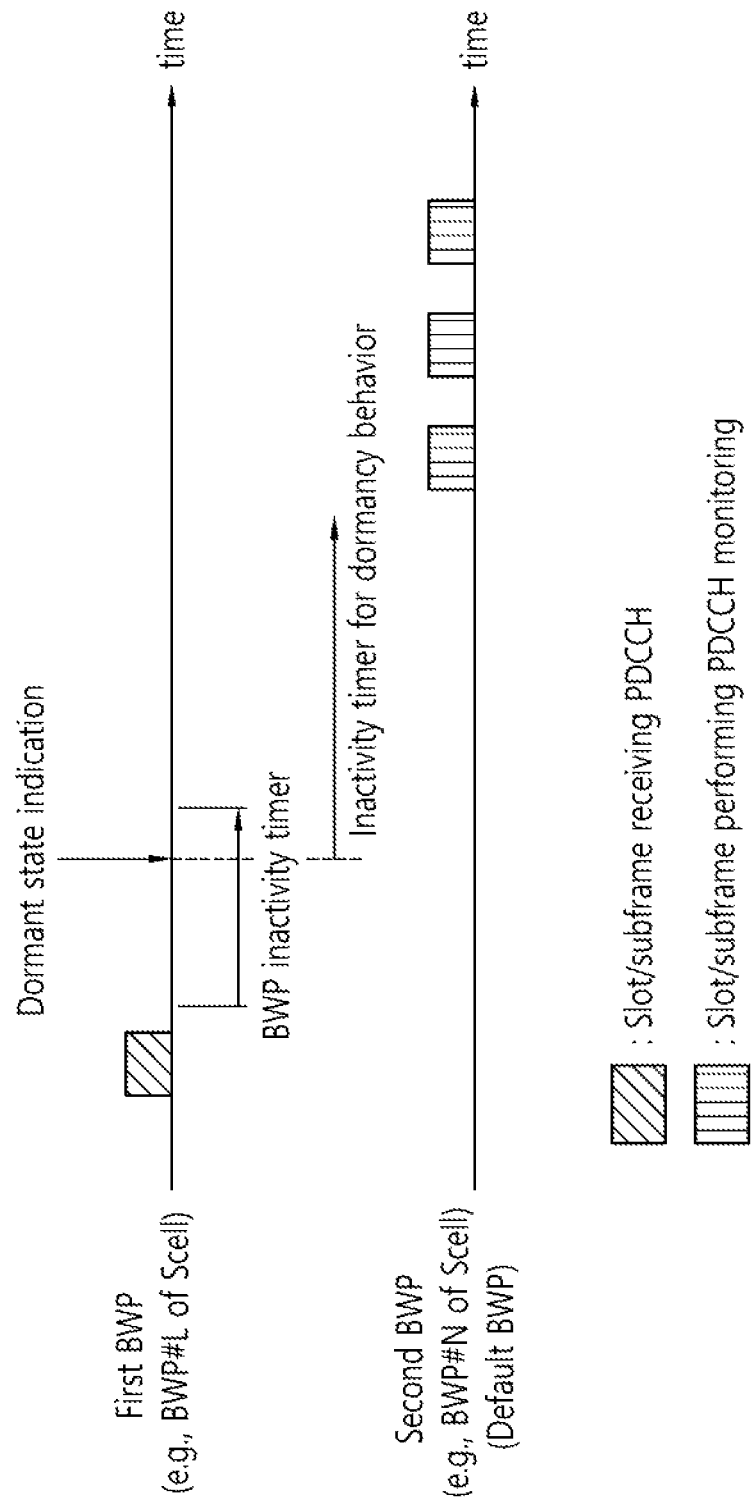
FIG. 23 illustrates another example of the BWP operation of the UE.

FIG. 23 illustrates another example of the BWP operation of the UE.

In addition, when the dormancy behavior is terminated by the inactivity timer for the dormancy behavior, the UE may move to the default BWP of the corresponding cell or switch to a normal state. Alternatively, when the network terminates dormancy behavior by the inactivity timer, the UE may designate and indicate the BWP to move. This operation is illustrated in FIG. 23.

<Scheduling Information within a DCI Triggering Dormancy Behavior>

When the movement between D-BWP/N-BWP is indicated by DCI, and the corresponding DCI is a general scheduling DCI, a problem may occur when it is not clear whether the scheduling information in the DCI operates. For example, when performing an operation for PDSCH scheduling in DCI indicating movement to D-BWP, additional operation may be required depending on whether the reception of the corresponding PDSCH is successful. This may mean that the PDCCH/PDSCH transmission/reception operation may continue even in the D-BWP. In order to solve such a problem, the present disclosure proposes the following method.

Case 1) when PDSCH Scheduling Information Exists in DCI Indicating Dormancy Behavior for a Specific Cell (or DCI Indicating Switching to Dormant BWP)

As described above, since PDSCH transmission/reception in D-BWP may cause additional PDCCH/PDSCH transmission/reception, an operation contrary to the purpose of dormant BWP may be performed. Accordingly, PDSCH scheduling information for D-BWP included in DCI indicating dormancy behavior may be ignored. In addition, the decoding performance of the UE may be improved by transmitting a known bit (sequence) to the corresponding field. For this purpose, known bit information for (the field related to PDSCH scheduling) may be indicated by the network or through previous definition.

Case 2) when PDSCH Scheduling (or UL Scheduling) Information Exists in DCI (or DCI Indicating Switching from Dormant BWP to Normal BWP) Indicating the Switching from Dormancy Behavior to Normal Behavior In the case of case 2, since PDSCH scheduling information (or UL scheduling information) may reduce PDCCH transmission in N-BWP or in a normal state, it may be desirable to apply PDSCH scheduling information. However, case 2 may determine whether PDSCH scheduling information (or UL scheduling information) is applied while being limited to the case of UL/DL scheduling related information in the N-BWP to which the corresponding PDSCH scheduling information (or UL scheduling information) is switched or PDSCH (or UL transmission) related information in the normal state. For example, when a field indicating dormancy behavior for a specific SCell(s) is added to DCI for scheduling PDSCH of PCell, the PDSCH scheduling information of the corresponding DCI may also mean PDSCH-related information in the PCell.

<HARQ Feedback of a DCI Triggering Dormancy Behavior>

Since the dormancy behavior may limit the PDCCH/PDSCH transmission/reception operation in the indicated cell as much as possible (according to the definition), subsequent operations of the network and the UE may be greatly affected by missing/false alarms, etc. In order to solve this problem, a method of improving decoding performance may be applied or an additional identification operation for the dormancy behavior indication may be required. In order to solve this problem, the present specification proposes to perform ACK/NACK feedback for the movement to the D-BWP or the switching to the dormant state.

To this end, the following method may be considered. The options below may be implemented alone or in combination. In the following, when DCI is configured only with an indication of dormancy behavior (since the UE may not determine whether NACK is present), the following proposal may be interpreted as transmitting ACK signaling. Alternatively, when DCI indicating dormancy behavior also includes PDSCH scheduling, it may mean that ACK/NACK (uplink transmission in case of uplink scheduling) for the corresponding PDSCH has received a command for dormancy behavior. (In other words, since both ACK and NACK may mean that DCI reception is normally received, both ACK/NACK may mean that an indication for dormancy behavior has been received.)

Case 1) Dormancy Command+UL/DL Scheduling

DCI indicating dormancy behavior may include UL/DL scheduling information, and scheduled UL transmission and ACK/NACK for DL may mean that DCI including dormancy behavior has been properly received, and thus the UE and the network may assume that the indicated dormancy behavior is performed. (Herein, since NACK means NACK for PDSCH reception, NACK may also mean that an indication for dormancy behavior has been received.)

Case 1-1) When the Target of UL/DL Scheduling is Dormancy BWP (or Dormant State)

It may be assumed that the UE may perform dormancy behavior after termination of the scheduled UL/DL scheduling, and it may be assumed that the ACK/NACK resource (or UL resource) for the corresponding scheduling in D-BWP (or dormant state) follows the existing ACK/NACK resource determination method and UL transmission method. After terminating the corresponding UL/DL transmission/reception, the UE may perform dormancy behavior, and may assume that there is no scheduling thereafter or ignore it.

Case 1-2) when the Target of UL/DL Scheduling is Scheduling Cell/BWP (or Normal State)

In this case, ACK/NACK or UL transmission in the scheduling cell/BWP (or normal state) may mean that the dormancy command is normally received, and the UE may perform dormancy behavior.

Case 2) Dormancy Command+Non-Scheduling/Fake-Scheduling

Case 2 is a case in which dormancy behavior is indicated by DCI (or DCI that may assume the scheduling information field as a dummy) in which only the command for dormancy behavior is valid without UL/DL scheduling information. In this case, because there is no associated UL/DL transmission/reception, feedback information about DCI (when DCI is not received, the UE does not know whether DCI is transmitted, so it may actually mean ACK transmission) may be transmitted. In this case, feedback for the dormancy command is transmitted in the dormancy BWP (or dormant state), and the feedback resource is indicated together by DCI for transmitting the dormancy command, or feedback may be performed through a predefined feedback resource.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

When the embodiments of the present specification described above are once again described with reference to the drawings, they may be organized as follows.

Hereinafter, embodiments of the present specification will be described with reference to the drawings. The following drawings were created to explain a specific example of the present specification. The names of specific devices described in the drawings or the names of specific signals/messages/fields are presented by way of example, so that the technical features of the present specification are not limited to the specific names used in the following drawings.

Figure 24:
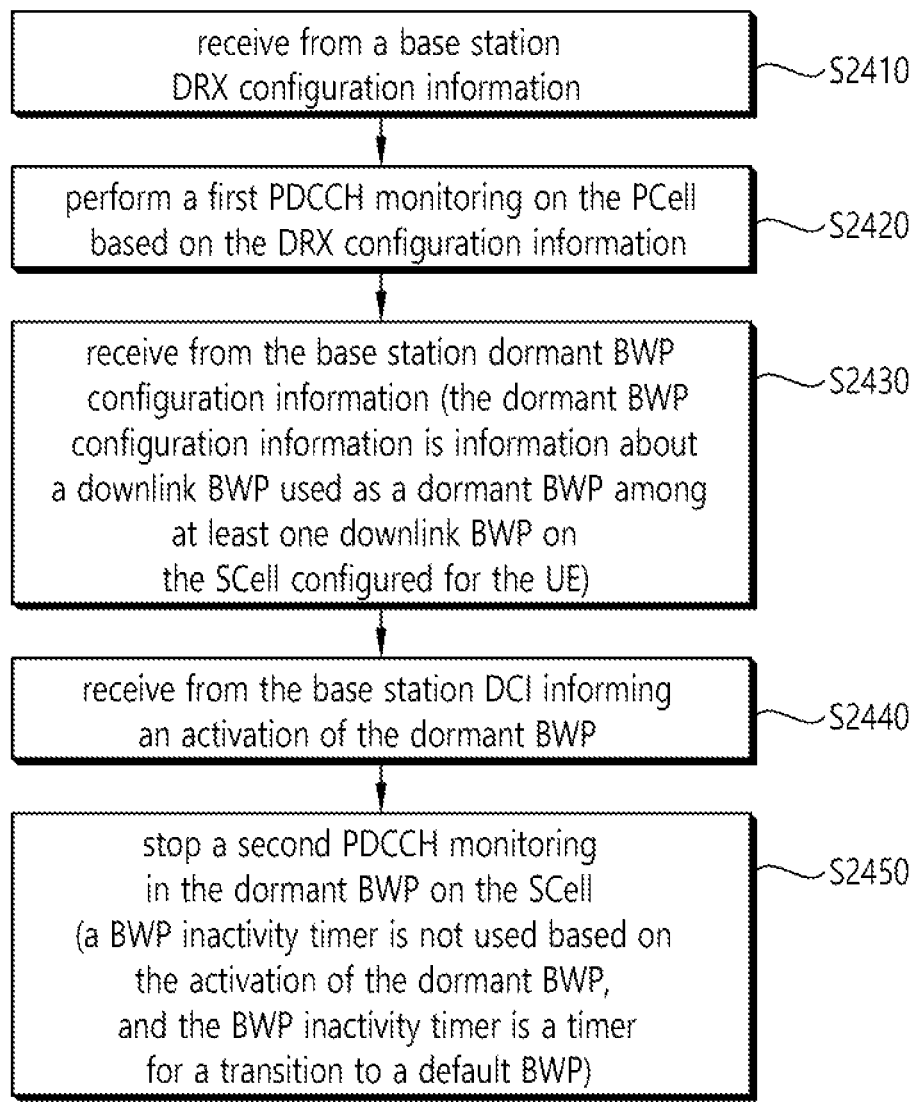
FIG. 24 is a flowchart of a DRX operation method from the viewpoint of a terminal, according to an embodiment of the present specification.

FIG. 24 is a flowchart of a DRX operation method from the viewpoint of a terminal, according to an embodiment of the present specification.

Referring to FIG. 24, a terminal may receive from a base station DRX configuration information (S2410). Since a more specific example of this example is the same as described above, in order to avoid unnecessary repetition of the description, the repetition description of the overlapping content will be omitted.

The terminal may perform first PDCCH monitoring on a PCell based on the DRX configuration information (S1620). Since a more specific example of this example is the same as described above, in order to avoid unnecessary repetition of the description, the repetition description of the overlapping content will be omitted.

The terminal may receive dormant bandwidth part (BWP) configuration information from the base station (S2430). Here, the dormant BWP configuration information may be information on a downlink BWP used as a dormant BWP in SCell among at least one downlink BWP configured for the terminal. Since a more specific example of this example is the same as described above, in order to avoid unnecessary repetition of the description, the repetition description of the overlapping content will be omitted.

The terminal may receive from the base station downlink control information (DCI) indicating activation of the dormant BWP (S2440). Since a more specific example of this example is the same as described above, in order to avoid unnecessary repetition of the description, the repetition description of the overlapping content will be omitted.

The terminal may stop second PDCCH monitoring on the SCell (S2450). Here, based on the activation of the dormant BWP, the BWP inactivity timer, which is a timer for transition to the default BWP, may not be used. Since a more specific example of this example is the same as described above, in order to avoid unnecessary repetition of the description, the repetition description of the overlapping content will be omitted.

Figure 25:
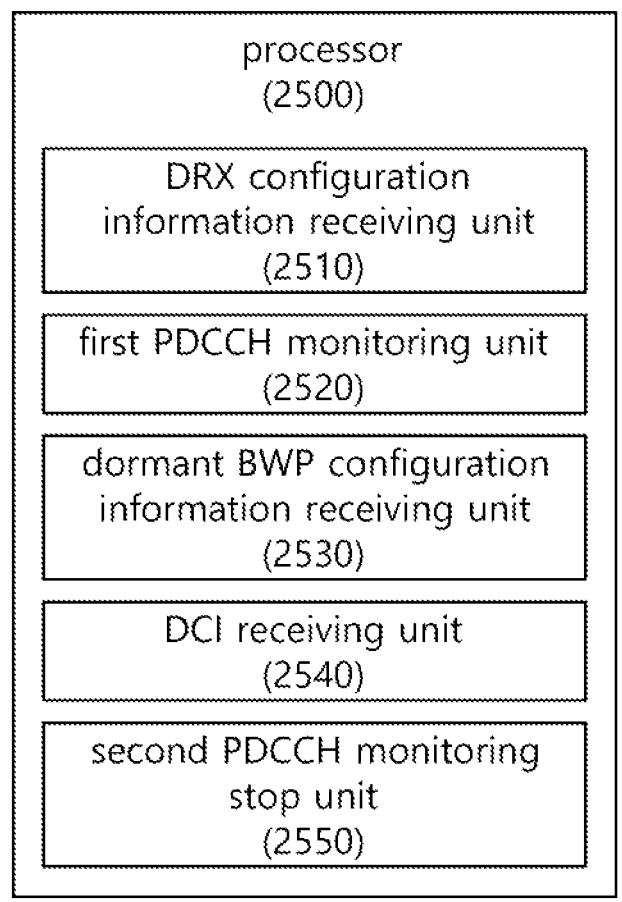
FIG. 25 is a block diagram of an example of a DRX operation device from the viewpoint of a terminal, according to an embodiment of the present disclosure.

FIG. 25 is a block diagram of an example of a DRX operation device from the viewpoint of a terminal, according to an embodiment of the present disclosure.

Referring to FIG. 25, the processor 2500 may include a DRX configuration information receiving unit 2510, a first PDCCH monitoring unit 2520, a dormant BWP configuration information receiving unit 2530, a DCI receiving unit 2540, and a second PDCCH monitoring stop unit 2550. Here, the processor 2500 may correspond to the aforementioned processor.

The DRX configuration information receiving unit 2510 may be configured to control the transceiver to receive discontinuous reception (DRX) configuration information from the base station. Since a more specific example of this example is the same as described above, in order to avoid unnecessary repetition of the description, the repetition description of the overlapping content will be omitted.

The first PDCCH monitoring unit 2520 may be configured to perform a first physical downlink control channel (PDCCH) monitoring on the PCell based on the DRX configuration information. Since a more specific example of this example is the same as described above, in order to avoid unnecessary repetition of the description, the repetition description of the overlapping content will be omitted.

The dormant BWP configuration information receiving unit 2530 may be configured to control the transceiver to receive the dormant BWP configuration information from the base station. Here, the dormant BWP configuration information may be information on a downlink BWP used as a dormant BWP on the SCell among at least one downlink BWP configured for the terminal. Since a more specific example of this example is the same as described above, in order to avoid unnecessary repetition of the description, the repetition description of the overlapping content will be omitted.

The DCI receiving unit 2540 may be configured to control the transceiver to receive downlink control information (DCI) informing of activation of the dormant BWP from the base station. Since a more specific example of this example is the same as described above, in order to avoid unnecessary repetition of the description, the repetition description of the overlapping content will be omitted.

The second PDCCH monitoring stop unit 2550 may be configured to stop monitoring the second PDCCH in the dormant BWP on the SCell. Here, the BWP inactivity timer is not used based on the activation of the dormant BWP, and the BWP inactivity timer may be a timer for transition to the default BWP. Since a more specific example of this example is the same as described above, in order to avoid unnecessary repetition of the description, the repetition description of the overlapping content will be omitted.

Meanwhile, although not shown separately, the embodiments of the present disclosure also provide the following embodiments.

According to an embodiment, provided is an apparatus comprising at least one memory; and at least one processor being operatively connected to the at least one memory, wherein the processor is configured to: control the transceiver to receive from a base station DRX configuration information; perform first PDCCH monitoring on PCell based on the DRX configuration information; control the transceiver to receive, from the base station, dormant bandwidth part (BWP) configuration information, wherein the dormant BWP configuration information is information on a downlink BWP used as a dormant BWP in SCell among at least one downlink BWP configured for the UE; control the transceiver to receive, from the base station, downlink control information (DCI) informing an activation of the dormant BWP; and stop second PDCCH monitoring on the dormant BWP on SCell, wherein a BWP inactivity timer is not used based on the activation of the dormant BWP, where the BWP inactivity timer is a timer for a transition to a default BWP.

According to another embodiment, provided is at least one computer readable medium comprising instructions being executed by at least one processor, the at least one processor is configured to: control the transceiver to receive from a base station DRX configuration information; perform first PDCCH monitoring on PCell based on the DRX configuration information; control the transceiver to receive, from a base station, dormant bandwidth part (BWP) configuration information, wherein the dormant BWP configuration information is information on a downlink BWP used as a dormant BWP among at least one downlink BWP configured for the UE; control the transceiver to receive, from the base station, downlink control information (DCI) informing an activation of the dormant BWP; and stop second PDCCH monitoring on the dormant BWP on SCell, wherein a BWP inactivity timer is not used based on the activation of the dormant BWP, where the BWP inactivity timer is a timer for a transition to a default BWP.

Figure 26:
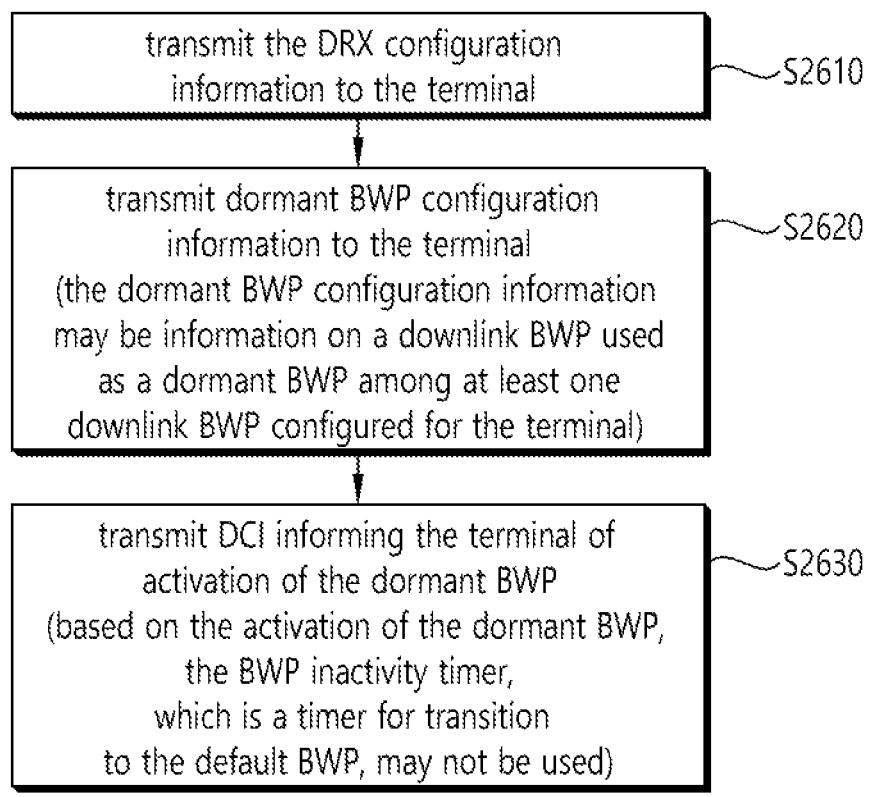
FIG. 26 is a flowchart of a method for transmitting DRX configuration information from a base station perspective, according to an embodiment of the present disclosure.

FIG. 26 is a flowchart of a method for transmitting DRX configuration information from a base station perspective, according to an embodiment of the present disclosure.

According to FIG. 26, the base station may transmit the DRX configuration information for monitoring a physical downlink control channel (PDCCH) to the terminal (S2610). Since a more specific example of this example is the same as described above, in order to avoid unnecessary repetition of the description, the repetition description of the overlapping content will be omitted.

The base station may transmit dormant bandwidth part (BWP) configuration information to the terminal (S2620). Here, the dormant BWP configuration information may be information on a downlink BWP used as a dormant BWP among at least one downlink BWP configured for the terminal. Since a more specific example of this example is the same as described above, in order to avoid unnecessary repetition of the description, the repetition description of the overlapping content will be omitted.

The base station may transmit downlink control information (DCI) informing the terminal of activation of the dormant BWP (S2630). Here, based on the activation of the dormant BWP, the BWP inactivity timer, which is a timer for transition to the default BWP, may not be used. Since a more specific example of this example is the same as described above, in order to avoid unnecessary repetition of the description, the repetition description of the overlapping content will be omitted.

Figure 27:
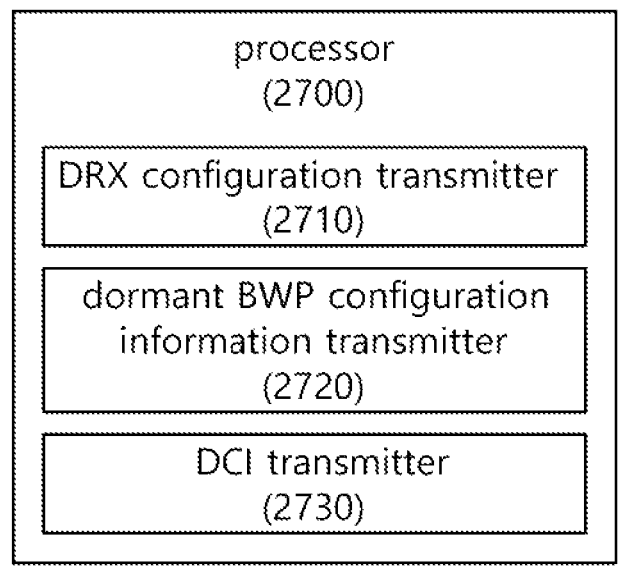
FIG. 27 is a block diagram of an example of a device transmitting DRX configuration information from the viewpoint of a base station, according to an embodiment of the present disclosure.

FIG. 27 is a block diagram of an example of a device transmitting DRX configuration information from the viewpoint of a base station, according to an embodiment of the present disclosure.

Referring to FIG. 27, the processor 2700 may include a DRX configuration transmitter 2710, a dormant BWP configuration information transmitter 2720, and a DCI transmitter 2730. Here, the processor 2700 may correspond to the processor described above.

The DRX configuration transmitter 2710 may be configured to control the transceiver to transmit discontinuous reception (DRX) configuration information for monitoring a physical downlink control channel (PDCCH) to the terminal. Since a more specific example of this example is the same as described above, in order to avoid unnecessary repetition of the description, the repetition description of the overlapping content will be omitted.

The dormant BWP configuration information transmitter 2720 may be configured to control the transceiver to transmit the dormant BWP configuration information to the terminal. Here, the dormant BWP configuration information may be information on a downlink BWP used as a dormant BWP among at least one downlink BWP configured for the terminal. Since a more specific example of this example is the same as described above, in order to avoid unnecessary repetition of the description, the repetition description of the overlapping content will be omitted.

The DCI transmitter 2730 may be configured to control the transceiver to transmit downlink control information (DCI) informing the terminal of activation of the dormant BWP. Here, the PDCCH monitoring is not performed on the dormant BWP, the BWP inactivity timer is not used based on the activation of the dormant BWP, and the BWP inactivity timer may be a timer for transition to the default BWP. Since a more specific example of this example is the same as described above, in order to avoid unnecessary repetition of the description, the repetition description of the overlapping content will be omitted.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. A method comprising:
   receiving, from a base station, discontinuous reception (DRX) configuration information by a user equipment (UE) to which a primary cell (PCell) and a secondary cell (SCell) are configured;
   performing, by the UE, a first physical downlink control channel (PDCCH) monitoring based on the DRX configuration information;
   receiving, from the base station by the UE, dormant bandwidth part (BWP) configuration information, wherein the dormant BWP configuration information is information about a downlink BWP to be used as a dormant BWP among at least one downlink BWP on the SCell configured for the UE;
   receiving, from the base station by the UE, downlink control information (DCI) informing an activation of the dormant BWP;
   transmitting Hybrid Automatic Repeat and reQuest-acknowledgement (HARQ-ACK) information for the DCI to the base station in a specific resource by the UE; and
   stopping a second PDCCH monitoring in the dormant BWP on the SCell by the UE,
   wherein the specific resource is informed by the DCI, and
   wherein a BWP inactivity timer is not used for transitioning from the dormant BWP, which is activated, to a default BWP.

2. The method of claim 1, wherein the UE continues to perform channel state information (CSI) measurement on the dormant BWP.

3. The method of claim 1, wherein the default BWP is a BWP to which the UE transitions based on the BWP inactivity timer expiring.

4. The method of claim 1, wherein the dormant BWP is a BWP different from the default BWP.

5. The method of claim 4, wherein the BWP inactivity timer is not used based on the dormant BWP not being the default BWP.

6. The method of claim 1, wherein based on the dormant BWP being activated and based on running of the BWP inactivity timer, the UE stops the BWP inactivity timer.

7. The method of claim 1, wherein the UE stops the BWP inactivity timer without a transition to the default BWP, based on a release of the BWP inactivity timer.

8. The method of claim 1, wherein the default BWP is a downlink BWP on the SCell.

9. A user equipment (UE) comprising:
   at least one transceiver;
   at least one memory; and
   at least one processor being operatively connected to the at least one memory and the at least one transceiver,
   wherein the at least one memory stores instructions that, based on being executed by the at least one processor, cause the at least one processor to perform operations comprising:
   receiving, from a base station, discontinuous reception (DRX) configuration information by the UE to which a primary cell (PCell) and a secondary cell (SCell) are configured;
   performing, by the UE, a first physical downlink control channel (PDCCH) monitoring based on the DRX configuration information;
   receiving, from the base station by the UE, dormant bandwidth part (BWP) configuration information,
   wherein the dormant BWP configuration information is information about a downlink BWP to be used as a dormant BWP among at least one downlink BWP on the SCell configured for the UE;

receiving, from the base station by the UE, downlink control information (DCI) informing an activation of the dormant BWP;

transmitting Hybrid Automatic Repeat and reQuest-acknowledgement (HARQ-ACK) information for the DCI to the base station in a specific resource by the UE; and stopping a second PDCCH monitoring in the dormant BWP on the SCell by the UE, wherein the specific resource is informed by the DCI, and wherein a BWP inactivity timer is not used for transitioning from the dormant BWP, which is activated, to a default BWP.

10. An apparatus comprising:

at least one memory; and at least one processor being operatively connected to the at least one memory, wherein the at least one memory stores instructions that, based on being executed by the at least one processor, cause the at least one processor to perform operations comprising:

controlling at least one transceiver to receive, from a base station, discontinuous reception (DRX) configuration information;

performing a first physical downlink control channel (PDCCH) monitoring based on the DRX configuration information;

controlling the at least one transceiver to receive, from the base station, dormant bandwidth part (BWP) configuration information, wherein the dormant BWP configuration information is information about a downlink BWP to be used as a dormant BWP among at least one downlink BWP on a secondary (SCell) configured for the UE;

controlling the transceiver to receive, from the base station, downlink control information (DCI) informing an activation of the dormant BWP;

transmitting Hybrid Automatic Repeat and reQuest-acknowledgement (HARQ-ACK) information for the DCI to the base station in a specific resource; and stopping a second PDCCH monitoring in the dormant BWP on the SCell, wherein the specific resource is informed by the DCI, and wherein a BWP inactivity timer is not used for transitioning from the dormant BWP, which is activated, to a default BWP.

* * * * *